(12) United States Patent
Liu et al.

(10) Patent No.: US 12,253,781 B2
(45) Date of Patent: Mar. 18, 2025

(54) ARRAY SUBSTRATE, DISPLAY PANEL, AND DISPLAY DEVICE

(71) Applicants: Hefei BOE Optoelectronics Technology Co., Ltd., Anhui (CN); BOE Technology Group Co., Ltd., Beijing (CN)

(72) Inventors: Zhaofan Liu, Beijing (CN); Wei Xue, Beijing (CN); Xianxue Duan, Beijing (CN); Hongmin Li, Beijing (CN)

(73) Assignees: Hefei BOE Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/261,279

(22) PCT Filed: Apr. 27, 2022

(86) PCT No.: PCT/CN2022/089644
§ 371 (c)(1),
(2) Date: Jul. 13, 2023

(87) PCT Pub. No.: WO2023/206161
PCT Pub. Date: Nov. 22, 2023

(65) Prior Publication Data
US 2025/0013110 A1 Jan. 9, 2025

(51) Int. Cl.
*G02F 1/1368* (2006.01)
*G02F 1/1362* (2006.01)

(52) U.S. Cl.
CPC ...... *G02F 1/1368* (2013.01); *G02F 1/136222* (2021.01); *G02F 1/136286* (2013.01)

(58) Field of Classification Search
CPC ............. G02F 1/1368; G02F 1/136222; G02F 1/136286
See application file for complete search history.

(56) References Cited

U.S. PATENT DOCUMENTS 6,844,955 B2  1/2005  Nimura
6,924,858 B2  8/2005  Nagayama
(Continued)

FOREIGN PATENT DOCUMENTS

CN   1389752 A    1/2003
CN   100339754 C  9/2007
(Continued)

OTHER PUBLICATIONS

International Search Report from PCT/CN2022/089644 dated Nov. 16, 2022.
Written Opinion from PCT/CN2022/089644 dated Nov. 16, 2022.

*Primary Examiner* — Joseph L Williams
(74) *Attorney, Agent, or Firm* — Calfee, Halter & Griswold LLP

(57) ABSTRACT

An array substrate includes a first substrate, a switch layer group, an insulation layer group and a reflective layer. The switch layer group includes switch units and first shading layers, the first shading layers being spaced apart, the first shading layer being disposed on a same layer and of a same material as one layer in the switch unit. The insulating layer group is provided with a plurality of first protrusions on a surface away from the first substrate. The reflective layer is provided with a plurality of second protrusions on a surface away from the first substrate. An orthographic projection of the first protrusion on the first substrate is within an orthographic projection of the second protrusion on the first substrate, and an orthographic projection of the first shading layer on the first substrate is within an orthographic projection of the reflective layer on the first substrate.

20 Claims, 12 Drawing Sheets

(56) References Cited

U.S. PATENT DOCUMENTS

| | | |
|---|---|---|
| 8,735,187 B2 | 5/2014 | Lee et al. |
| 2002/0196517 A1 | 12/2002 | Nimura |
| 2003/0007115 A1 | 1/2003 | Nagayama |
| 2004/0119901 A1 | 6/2004 | Kang |
| 2011/0272697 A1 | 11/2011 | Lee et al. |
| 2012/0038862 A1* | 2/2012 | Shiau .................... G02B 5/223 |
| | | 349/194 |

FOREIGN PATENT DOCUMENTS

| | | |
|---|---|---|
| CN | 101866075 A | 10/2010 |
| CN | 102236230 A | 11/2011 |
| CN | 110518024 A | 11/2019 |
| CN | 110518024 B | 5/2022 |
| JP | H0910510 A | 4/1997 |
| JP | H09101510 A | 4/1997 |

\* cited by examiner

ARRAY SUBSTRATE, DISPLAY PANEL, AND DISPLAY DEVICE

CROSS-REFERENCE TO RELATED APPLICATIONS

The present application is the U.S. National phase application of International Application No. PCT/CN2022/089644, filed on Apr. 27, 2022, the entire contents of which are hereby incorporated by reference in its entirety.

TECHNICAL FIELD

The present disclosure relates to the field of display technologies, and in particular, to an array substrate, display panel, and display device.

BACKGROUND

Reflection type liquid crystal display (RLCD) is widely used in e-books, digital billboards and other products because of its advantages of thinness, energy saving and eye protection.

However, current RLCDs have narrow viewing angles and uneven displays.

It should be noted that the above information disclosed in the "BACKGROUND" section is intended only to enhance the understanding of the background of this disclosure, and therefore it may include information that does not constitute prior art known to those of ordinary skill in the art.

SUMMARY

The purpose of the present disclosure is to provide an array substrate, a display panel, and a display device in order to overcome the above-mentioned deficiencies of the prior art.

According to an aspect of the present disclosure, there is provided an array substrate, including:
  a first substrate;
  a switch layer group on one side of the first substrate, where the switch layer group includes a plurality of switch units and a plurality of first shading layers; the plurality of first shading layers are spaced apart; and a first shading layer of the plurality of first shading layers is disposed on a same layer and of a same material as one layer in a switch unit of the plurality of switch units;
  an insulating layer group on one side of the switch layer group away from the first substrate, where a plurality of first protrusions are provided on one surface of the insulating layer group away from the first substrate; a first connection part is connected between adjacent first protrusions, and a height, in a third direction, of a first protrusion of the adjacent first protrusions is higher than a height, in the third direction, of the first connection part; and an orthographic projection of the first protrusion and the first connection part on the first substrate is within an orthographic projection of the first shading layer on the first substrate, the third direction being perpendicular to one surface of the first substrate close to the switch layer group; and
  a reflective layer on one side of the insulating layer group away from the first substrate, where a plurality of second protrusions are provided on one surface of the reflective layer away from the first substrate; an orthographic projection of the first protrusion on the first substrate is within an orthographic projection of a second protrusion of the plurality of second protrusions on the first substrate; and the reflective layer includes a plurality of reflective parts, and the orthographic projection of the first shading layer on the first substrate is within an orthographic projection of a reflective part of the plurality of reflective parts on the first substrate.

According to another aspect of the present disclosure, there is provided a display panel, including:
  the array substrate as described above;
  a color film substrate on one side of the array substrate close to the reflective layer;
  an adhesive frame between the array substrate and the color film substrate; and
  a liquid crystal layer between the array substrate and the color film substrate, and within the adhesive frame.

According to a further aspect of the present disclosure, there is provided a display device including a display panel as described above.

It should be understood that the above general description and the following detailed descriptions are exemplary and explanatory only and do not limit the present disclosure.

BRIEF DESCRIPTION OF THE DRAWINGS

The accompanying drawings herein are incorporated into and form part of the specification, show embodiments at that are consistent with the present disclosure, and are used in conjunction with the specification to explain the principles of the present disclosure. It will be apparent that the accompanying drawings in the following description are only some of embodiments of the present disclosure, and that other drawings may be obtained from them without creative effort by one of ordinary skill in the art.

DETAILED DESCRIPTION

Figure 1:
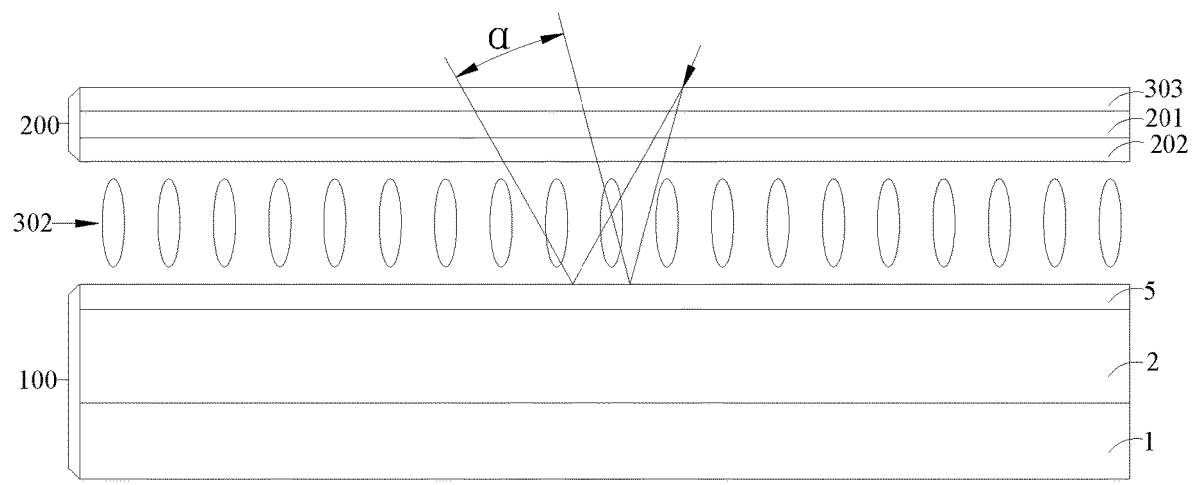
FIG. 1 is a structural schematic diagram of a display panel provided with a scattering film.

Exemplary embodiments will now be described more fully with reference to the accompanying drawings. However, the exemplary embodiments can be implemented in a variety of forms and should not be construed as being limited to the embodiments set forth herein; rather, the provision of these embodiments makes the present disclosure comprehensive and complete and conveys the ideas of the exemplary embodiments to those skilled in the art in a comprehensive manner. The same reference numerals in the drawings indicate the same or similar structures, and thus their detailed description will be omitted. In addition, the accompanying drawings are only schematic illustrations of the present disclosure and are not necessarily drawn to scale.

Although relative terms such as "up" and "down" are used in this specification to describe the relative relationship of one component of the sign to another, these terms are used in this specification only for convenience, for example, according to the direction of the examples described in the accompanying drawings. It should be understood that if the device of the sign is inverted so that it is upside down, the component described as being "up" will become the component described as being "down". When a structure is "on" another structure, it may mean that the structure is integrally formed on another structure, or that the structure is "directly" arranged on another structure, or that the structure is "indirectly" arranged on another structure through yet another structure.

The terms "a/an", "one", "the", "said" and "at least one" are used to indicate the existence of one or more elements/components/etc. The terms "including" and "having" are used to indicate open-ended inclusion and to mean that additional elements/components/etc. may exist in addition to the listed elements/components/etc. The terms "first", "second" and "third" are used as markers only and are not limitations on the number of objects thereof.

Referring to FIG. 1, some RLCD products need to use scattering film (or called polarizer (POL)) 303 for diffuse reflection. However, the scattering film is expensive, and the material of ½ wave plate in the scattering film is less tough, which is easy to break when it is thermally expanded in the reliability test, thus affecting the reliability test. Instead of the scattering film 303, a bump structure (second protrusion (s) 51) formed on a reflective layer 5 can be used for diffuse reflection of light.

Figure 2:
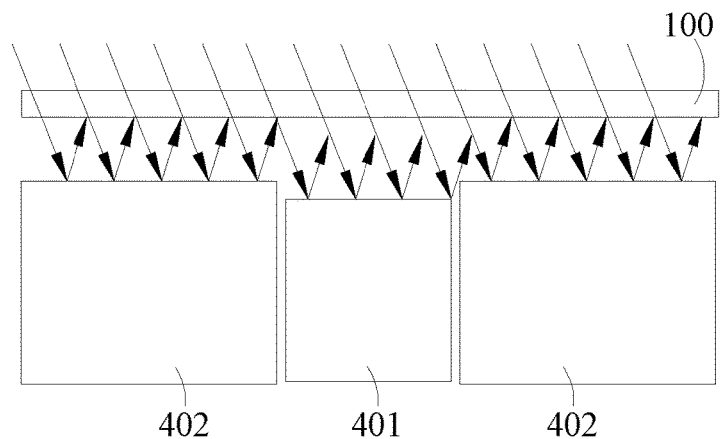
FIG. 2 a schematic diagram of a structure in a process of forming a first protrusion.

The inventor found that the main reason for the uneven display of the display panel is the uneven formation of the diffuse reflected light caused by the uneven formation of the bump structure (second protrusion(s) 51) on the reflective layer 5. Referring to FIG. 2, the main problem of the uneven formation of the bump structure (second protrusion(s) 51) is that the exposure equipment stage is provided with a support column 401 for taking and placing a first substrate 1, and the material of the support column 401 is different from the material of the equipment stage 402. Since the material of the support column 401 is different from the material of the equipment stage 402, when a insulating layer 32 is exposed and etched to form a first protrusion 34, the energy of the light reflected on an array substrate 100 through the equipment stage 402 and the support column 401 is different after the light irradiates on the equipment stage 402 and the support column 401, which results in different exposure energy for the insulating layer 32, and eventually leads to an angle difference between the first protrusion 34 formed at the support column 401 and the first protrusion 34 formed at the equipment stage 402, resulting in different reflectivity of the display panel at the support column 401 and the equipment stage 402, and uneven reflected light, which ultimately affects the display effect.

According to an exemplary embodiment of the present disclosure, there is provided an array substrate 100. As shown in FIGS. 3-19, the array substrate 100 may include a display area AA and a bonding area BOD, and the array substrate 100 may include a first substrate 1, a switch layer group 2, an insulating layer group 3, and a reflective layer 5. The switch layer group 2 is disposed on one side of the first substrate 1, and includes a plurality of switch units 23 and a plurality of first shading layers 21. The plurality of first shading layers 21 are spaced apart, and one first shading layer 21 of the plurality of first shading layers 21 is disposed on as the same layer and of the same material as one layer in one switch unit 23 of the plurality of switch units 23. The insulating layer group 3 is disposed on one side of the switch layer group 2 away from the first substrate 1, and provided with a plurality of first protrusions 34 on one surface of the insulating layer group 3 away from the first substrate 1. The reflective layer 5 is disposed on one side of the insulating layer group 3 away from the first substrate 1, and provided with a plurality of second protrusions 51 on one surface of the reflective layer 5 away from the first substrate 1. An orthographic projection of one first protrusion 34 of the plurality of first protrusions 34 on the first substrate 1 is located within an orthographic projection of one second protrusion 51 of the plurality of second protrusions 51 on the first substrate 1. The reflective layer 5 includes a plurality of reflective parts 53, and an orthographic projection of the first shading layer 21 on the first substrate 1 is located within an orthographic projection of one reflective part 53 of the plurality of reflective parts 53 on the first substrate 1.

Figure 4:
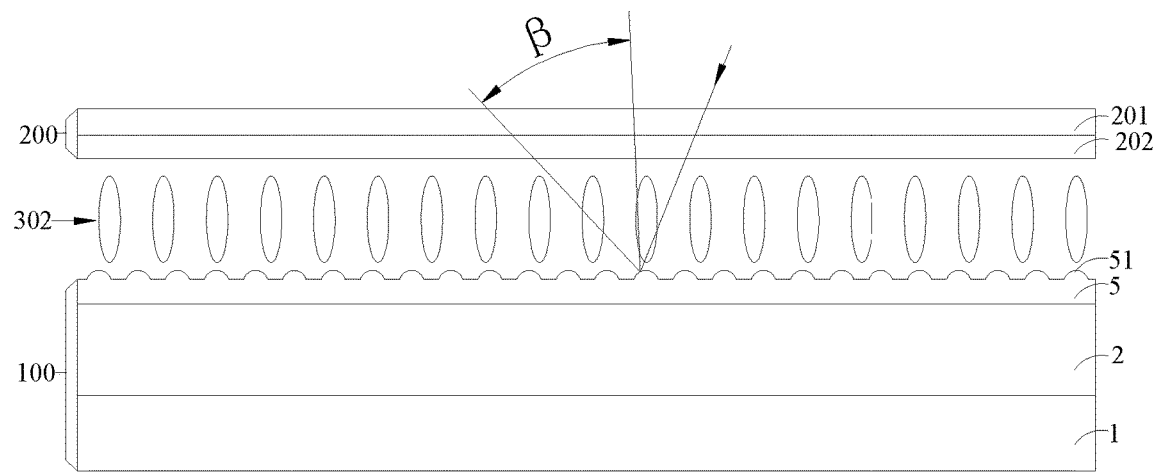
FIG. 4 is a structural schematic diagram of a display panel according to an exemplary embodiment of the present disclosure.

On the one hand, in the array substrate 100 of the present disclosure, the reflective layer 5 is provided with a plurality of second protrusions 51 on the side of the reflective layer 5 away from the first substrate 1 instead of the scattering film 303, and the ambient light incident to the array substrate 100 is reflected by the plurality of second protrusions 51 to form a diffuse reflection, which not only can reduce the cost, but also can improve the uniformity of view and reflection by the plurality of second protrusions 51. Referring to FIG. 1 and FIG. 4, FIG. 1 is a schematic diagram of the structure of a display panel with a scattering film, while FIG. 4 is a schematic diagram of the structure of a display panel of the present disclosure, from which it can be seen that the viewing angle α in FIG. 1 is smaller than the viewing angle β in FIG. 4.

On the other hand, the orthographic projection of the first shading layer 21 on the first substrate 1 is located within the orthographic projection of the reflective part 53 on the first substrate 1, and the spacing between the edge of the first shading layer 21 and the edge of the reflective part 53 is less than or equal to 30 microns. The area of the first shading layer 21 is made as large as possible, so that when the insulating layer group 3 is etched to form the first protruding portion(s) 34, the reflected light of the equipment stage 402 and the support column 401 can be blocked as much as possible to avoid the reflected light to the insulating layer group 3, thus avoiding the defect of the first protrusion(s) 34 formed unevenly due to the different intensity of the reflected light caused by the different materials of the equipment stage 402 and the support column 401, and thus avoiding the defect of the second protrusion(s) 51 formed unevenly. In addition, the plurality of second protrusions 51 are substantially identical in shape and uniformly provided at each place, so that the display panel is uniformly displayed at each place.

On yet another hand, the first shading layer 21 is disposed on the same layer and of the same material as one layer of the switch unit 23, i.e., the first shading layer 21 and that layer in the switch unit 23 are formed by the same patterning process, so that the provision of the first shading layer 21 will not increase the process steps and the cost of the preparation of the array substrate 100, and will not increase the thickness of the array substrate 100.

In this exemplary embodiment, the first substrate 1 may be a glass substrate. Of course, in some other exemplary embodiments of the present disclosure, the first substrate 1 may also be quartz, etc. The first substrate 1 may also include an insulating material layer, which may be provided on one side of a glass substrate, and the insulating material layer may be polyimide, polycarbonate, polyacrylate, polyetherimide, polyethersulfone, polyethylene terephthalate and polyethylene naphthalate and other resin-based materials.

Figure 3:
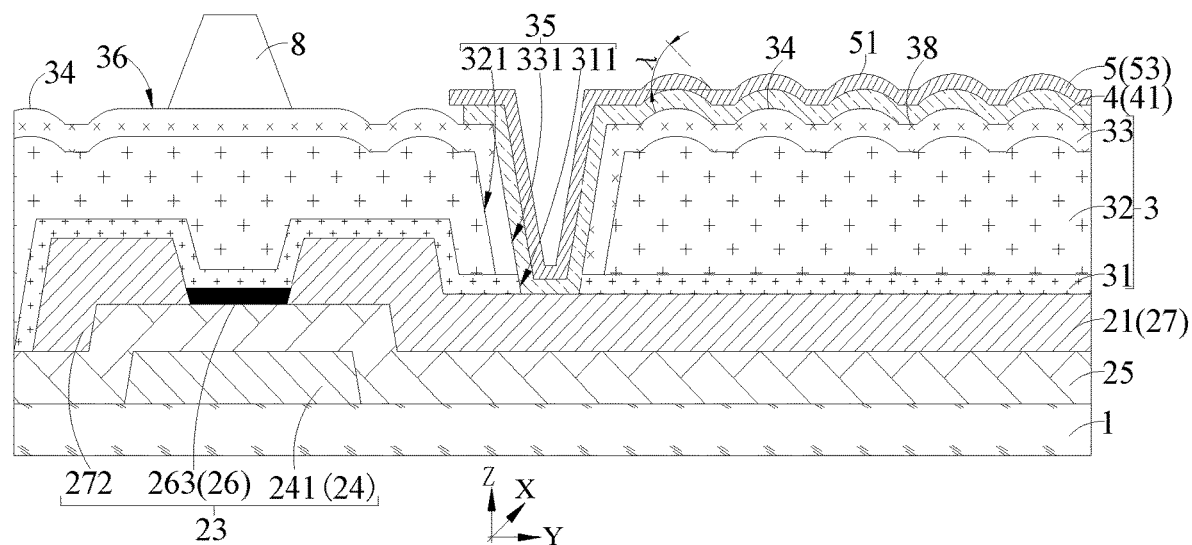
FIG. 3 is a structural schematic diagram of an array substrate according to a first exemplary embodiment of the present disclosure.
Figure 5:
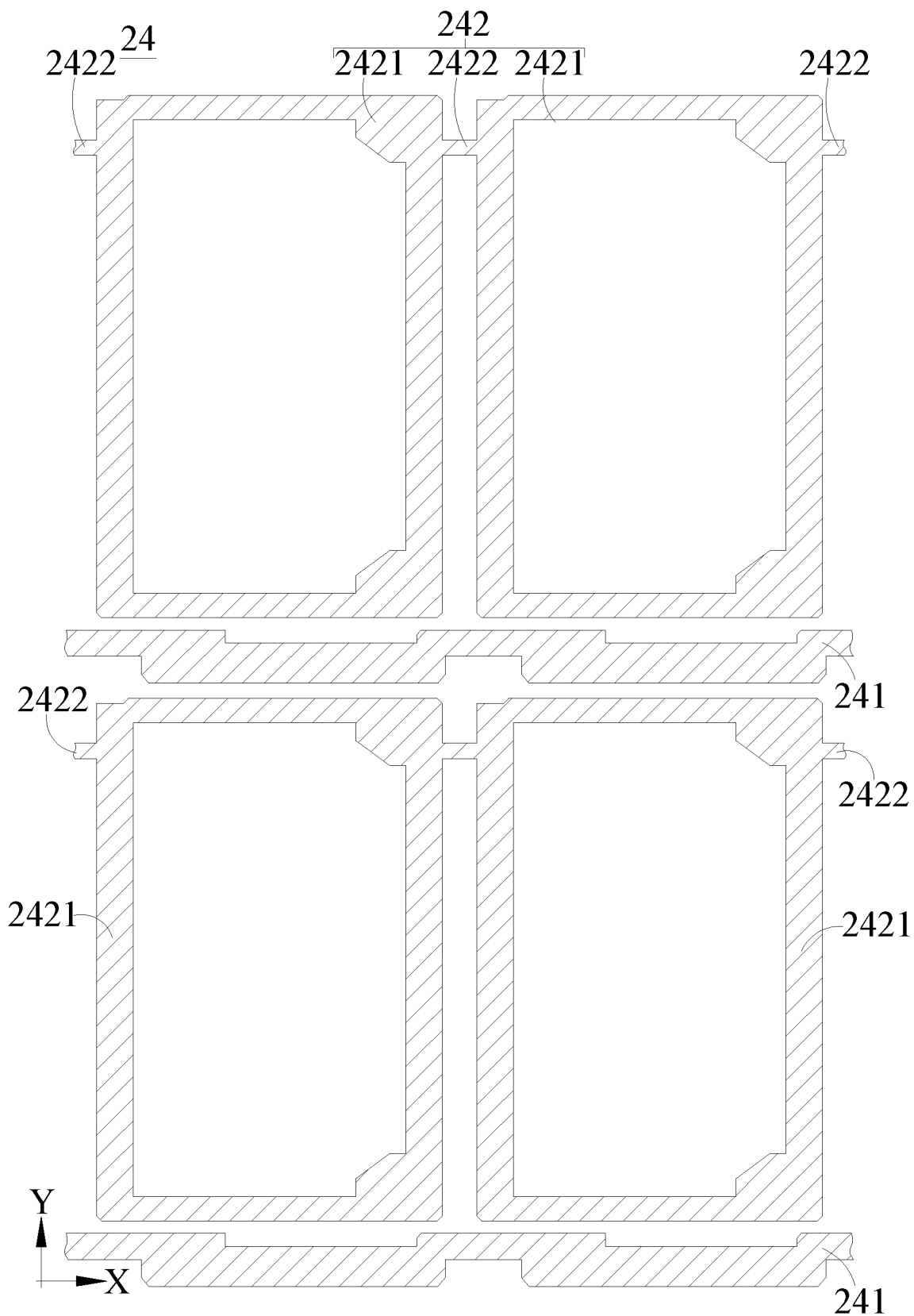
FIG. 5 is a structural schematic diagram of a gate layer in FIG. 3.

In this exemplary embodiment, referring to FIGS. 3 and 5, a gate layer 24 may be disposed on one side of the first substrate 1, and the gate layer 24 may include a plurality of gate lines 241, a plurality of second sub-electrodes 2421, and a plurality of connection parts 2422. The second sub-electrode 2421 may be provided in a frame shape, for example, the second sub-electrode 2421 may be provided as a rectangular frame. This design avoids a large storage capacitance due to a large overlapping area of the subsequentially formed first shading layer 21 and the second sub-electrode 2421, which will lead to a long charging time and failure to be fully charged, or avoids a small storage capacitance due to a small area of the second sub-electrode 2421, which will lead to cross talk.

The gate line 241 extends along a first direction X, and the first direction X is parallel to one surface of the first substrate 1 close to the switch layer group 2, wherein a portion of the gate line 241 can be used as a gate. The plurality of second sub-electrodes 2421 are arranged in an array. The plurality of second sub-electrodes 2421 arranged along the first direction X form a row, and one gate line 241 is provided between two adjacent rows of second sub-electrodes 2421, i.e., the gate line 241 is provided on a side of the second sub-electrode 2421 in a second direction Y. The connection part 2422 is connected between two adjacent second sub-electrodes 2421 arranged along the first direction X, that is, the plurality of second sub-electrodes 2421 located in the same row are connected to each other by the connection parts 2422. The second sub-electrodes 2421 may be common sub-electrodes, and since the common electrode is provided in a whole layer, the second sub-electrodes 2421 need to be connected as one.

Figure 6:
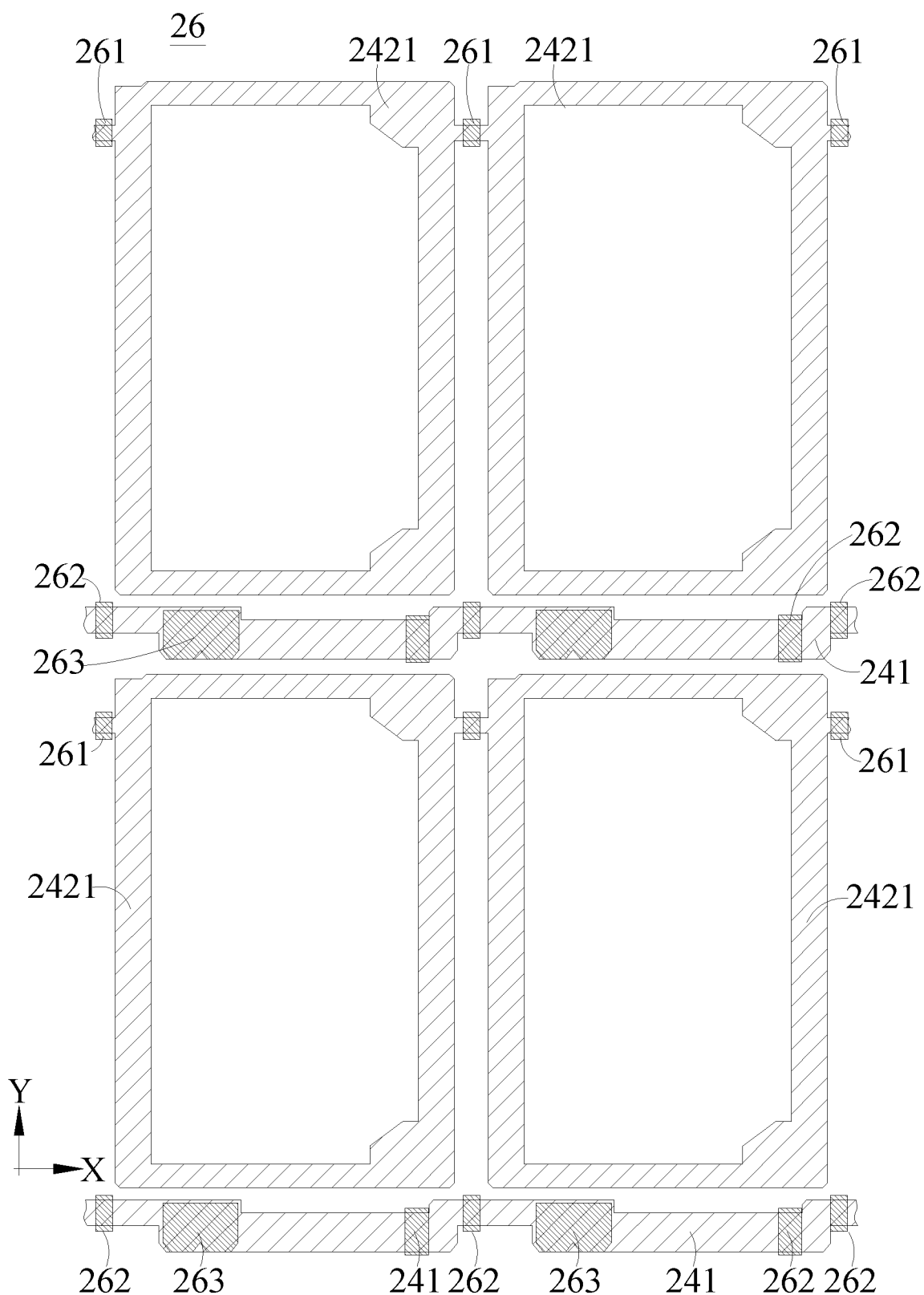
FIG. 6 is a schematic diagram of a structure after an active layer is formed on the basis of FIG. 5.

In this exemplary embodiment, with reference to FIG. 3 and FIG. 6, a gate insulating layer 25 is disposed on one side of the gate layer 24 away from the first substrate 1, and an active layer 26 is disposed on one side of the gate insulating layer 25 away from the first substrate 1. The active layer 26 may include a channel part 263, a conductor part, and a first filling part 261 and a second filling part 262. The channel part 263 is provided on one side of the gate line 241 away from the first substrate 1, and a portion of the gate line 241 corresponding to the channel part 263 serves as a gate. Two conductor parts are connected to both ends of the channel part 263 correspondingly. The first filling part 261 is disposed on one side of the connection part 2422 away from the first substrate 1 and covers at least a portion of a sidewall of the connection part 2422, so that the slope of the sidewall of the connection part 2422 is mitigated. The second filling part 262 is disposed on one side of the gate line 241 away from the first substrate 1 and covers at least a portion of the sidewall of the gate line 241, so that the slope of the sidewall of the gate line 241 is mitigated.

Figure 7:
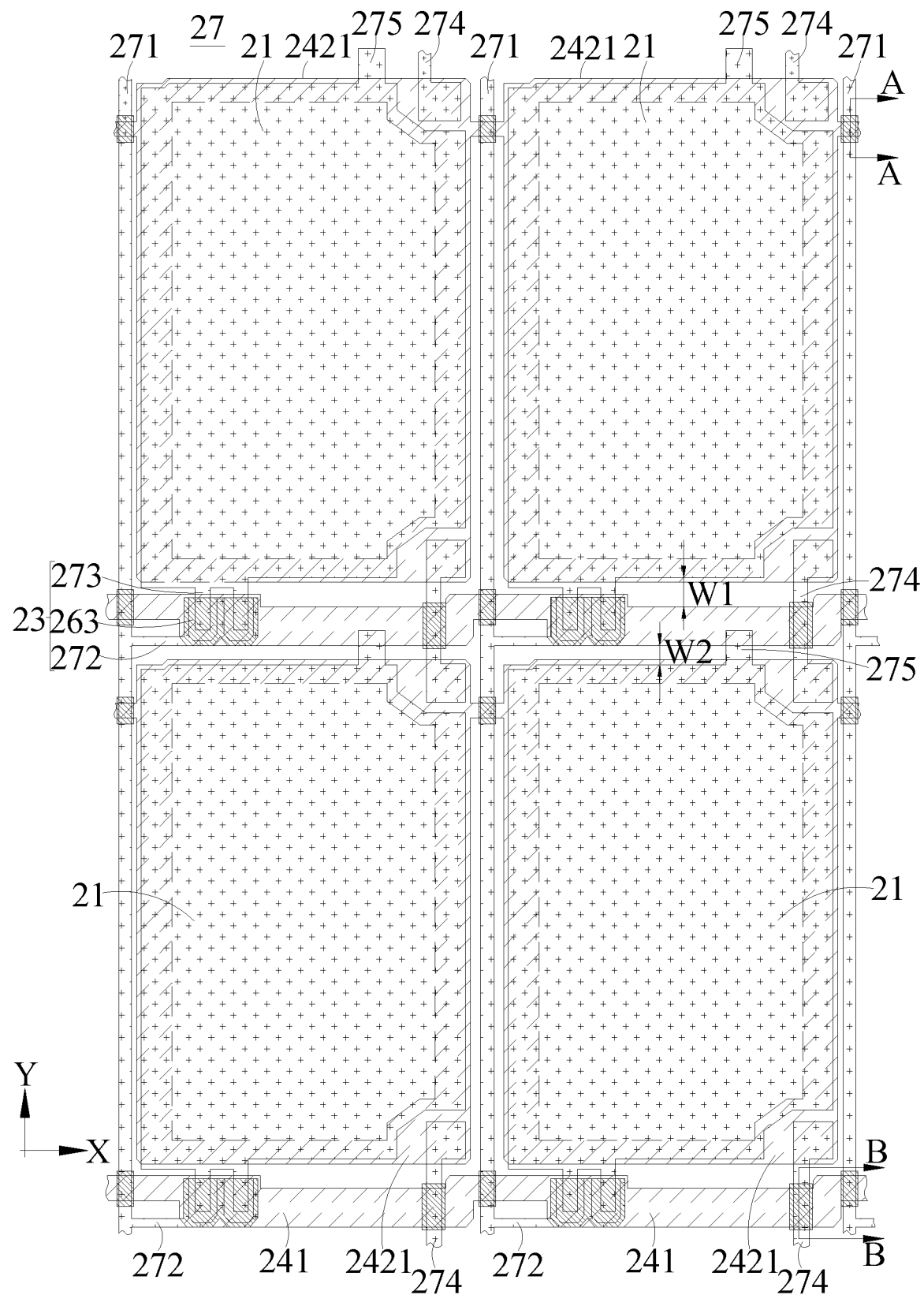
FIG. 7 is a schematic diagram of a structure after a source and drain layer is formed on the basis of FIG. 6.
Figure 8:
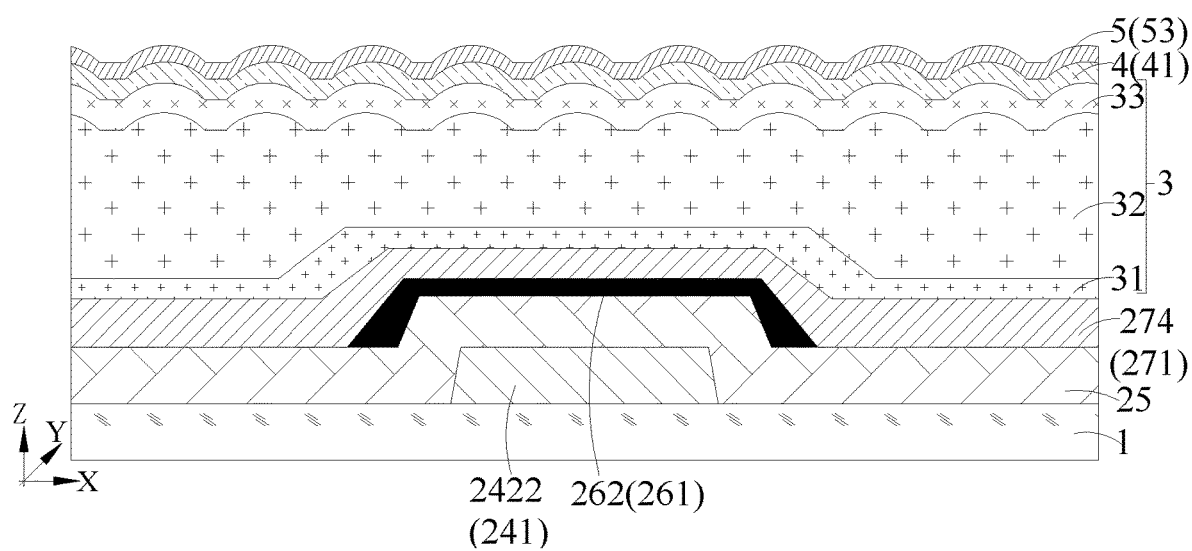
FIG. 8 is a schematic cross-sectional view after sectioning in accordance with A-A or B-B in FIG. 7.

In this exemplary embodiment, with reference to FIGS. 3, 7 and 8, a source and drain layer 27 is disposed on one side of the active layer 26 away from the first substrate 1. The source and drain layer 27 may include a source 272, a drain 273, a data line 271, the first shading layer 21 and a second electrode connection part 274. The data line 271 extends in the second direction Y, the second direction Y intersecting with the first direction X. For example, it may be that the second direction Y is perpendicular to the first direction X. Thus, the data line 271 will intersect with the gate line 241. However, due to the steep slope of the sidewall of the gate line 241 and the thin thickness of the gate insulating layer 25, which has a weak flattening effect on the gate line 241, the data line 271 tends to break at the intersection with the gate line 241, resulting in an open circuit. Therefore, a portion of the second filling part 262 is provided at the intersection of the gate line 241 and the data line 271, so that a portion of the date line 271 is located on one side of the second filling part 262 away from the gate line 241, and the second filling part 262 is able to further flatten the slope of the sidewall of the gate line 241, and in this way, the data line 271 on the second filling part 262 is not easily broken does not break easily and will not cause an open circuit.

Moreover, the data line 271 will also intersect with the second electrode connection part 274. However, since the second electrode connection part 274 is formed by the same patterning process as the gate line 241, the slope of the sidewall of the second electrode connection part 274 is also steeper, and the thickness of the gate insulating layer 25 is thinner, which has a weaker flattening effect on the second electrode connection part 274, the data line 271 is easily broken at the intersection with the second electrode connection part 274, resulting in an open circuit. Therefore, the first filling part 261 is provided at the intersection of the second electrode connection part 274 and the data line 271, so that a portion of the data line 271 is located on the side of the first filling part 261 away from the second electrode connection part 274, and the first filling part 261 is able to further flatten the slope of the sidewall of the second electrode connection part 274, and in this way, the data line 271 on the first filling part 261 is not easily broken and will not cause an open circuit.

Continue to refer to FIG. 7, the first shading layer 21 is provided on the side of the data line 271 in the first direction X, and the orthographic projection of the first shading layer 21 on the first substrate 1 is located within the orthographic projection of the second sub-electrode 2421 on the first substrate 1. For example, it may be that the orthographic projection of the first shading layer 21 on the first substrate 1 overlaps with the orthographic projection of the second sub-electrode 2421 on the first substrate 1. It may also be that the edge line of the orthographic projection of the first shading layer 21 on the first substrate 1 is located inside the outermost edge line of the orthographic projection of the second sub-electrode 2421 on the first substrate 1, and the spacing between the edge line of the orthographic projection of the first shading layer 21 on the first substrate 1 and the outermost edge line of the orthographic projection of the second sub-electrode 2421 on the first substrate 1 is greater than or equal to 0 μm and less than or equal to 10 μm. The overlapped portion of the first shading layer 21 and the sub-second electrode 2421 forms the storage capacitance, and the overlapped portion of the first shading layer 21 and the second sub-electrode 2421 is designed to be as large as the storage capacitance is required.

One end of the source 272 is connected to the data line 271 and the other end of the source 272 is connected to a conductor part. One end of the drain 273 is connected to the first shading layer 21 and the other end of the drain 273 is connected to another conductor part. The gate, channel part 263, source 272, drain 273, and two conductor parts form a switch unit 23, which is a thin film transistor.

It should be noted that the thin film transistor described in this specification is a bottom-gate type thin film transistor, but in other exemplary embodiments of the present disclosure, the thin film transistor may also be a top-gate type or a double-gate type, the specific structure of which will not be described here. In addition, the functions of "source" and "drain" may be interchanged when thin film transistors of opposite polarities are used or when the current direction changes during circuit operation. Therefore, in this specification, "source" and "drain" can be interchanged.

Continue to refer to FIG. 7, it is shown that the second sub-electrode 2421 may be a common sub-electrode, and since the common electrode is provided in a whole layer, the second sub-electrodes 2421 need to be connected as one. The two second sub-electrodes 2421 adjacent in the first direction X are connected as one by the connection part 2422. The second electrode connection part 274 is connected between the two second sub-electrodes 2421 adjacent in the second direction Y, and a portion of the second electrode connection part 274 is located on the side of the second filling part 262 away from the gate line 241. The second electrode connection part 274 will intersect with the gate line 241. However, due to the steep slope of the sidewall of the gate line 241 and the thin thickness of the gate insulating layer 25, which has a weak flattening effect on the gate line 241, the second electrode connection part 274 tends to break at the intersection with the gate line 241, resulting in an open circuit. The other portion of the second filling part 262 is provided at the intersection of the gate line 241 and the second electrode connection part 274, so that a portion of the second electrode connection part 274 is located on the side of the second filling part 262 away from the gate line 241, and the second filling part 262 is able to further flatten the slope of the sidewall of the gate line 241, and in this way, the second electrode connection part 274 on the second filling part 262 is not easily broken and will not cause an open circuit.

The spacing between the first shading layer 21 and the two gate lines 241 on two sides of the first shading layer 21 is different, or the spacing between the gate line 241 and the two first shading layers 21 on two sides of the gate line 241 is different. Specifically, the spacing W1 between the gate line 241 and the first shading layer 21 that is within the same pixel as the gate line 241, is greater than the spacing W2 between the gate line 241 and the first shading layer 21 that is not within the same pixel as the gate line 241.

Moreover, the second protrusion 51 and the first protrusion 34 may not be provided in the spacing between the first shading layer 21 and the gate line 241, i.e., the orthographic projections of the plurality of first protrusions 34 and the plurality of second protrusions 51 on the first substrate 1 do not overlap with the orthographic projection of the above spacing on the first substrate 1; and the orthographic projections of the plurality of first protrusions 34 and the plurality of second protrusions 51 on the first substrate 1 partially overlaps with the orthographic projection of the gate line 241 on the first substrate 1. This can increase the area of the reflective layer 5 and improve the display effect.

In this exemplary embodiment, the source and drain layer 27 may also include a maintenance block 275, which is connected to the side of the first shading layer 21 close to the gate line 241. Specifically, the maintenance block 275 may be located on the side of the first shading layer 21 away from the switch unit 23. Of course, the maintenance block 275 may also be located on the side of the first shading layer 21 close to the switch unit 23.

The orthographic projection of the maintenance block 275 on the first substrate 1 overlaps with the orthographic projection of the gate line 241 on the first substrate 1. In the case that the thin film transistor (switch unit 23) is damaged and the corresponding sub-pixel cannot be displayed, it is possible to cut off the source 272 connected to the data line 271 and connect the maintenance block 275 to the gate line 241 through the via hole, so that an electrical signal is fed to the first shading layer 21 through the gate line 241, and the first shading layer 21 transmits this electrical signal to the pixel electrode (first electrode 4) to realize the display of this pixel. Of course, in some other exemplary embodiments of the present disclosure, the drain 273 connected to the first shading layer 21 can be cut off.

In this exemplary embodiment, referring to FIG. 3, the insulating layer group 3 is disposed on the side of the source and drain layer 27 away from the first substrate 1. The insulating layer group 3 may include a first protective layer 31, an insulating layer 32, and a second protective layer 33. The first protective layer 31 is disposed on the side of the source and drain layer 27 away from the first substrate 1, and the first protective layer 31 is provided with a first sub-via hole 311 which is interconnected to the first shading layer 21. The material of the first protective layer 31 may be an inorganic material, for example, silicon nitride, silicon oxide, and so on. The thickness of the first protective layer 31 is greater than or equal to 100 nm and less than or equal to 500 nm.

The insulating layer 32 is disposed on the side of the first protective layer 31 away from the first substrate 1, and provided with a second sub-via hole 321 which is interconnected to the first sub-via hole 311, so that the second sub-via hole 321 is interconnected to the first shading layer 21. The material of the insulating layer 32 can be an organic material, for example, it can be polyimide, polycarbonate, polyacrylate, etc. The thickness of the insulating layer 32 is greater than or equal to 0.5 μm and less than or equal to 5 μm. Due to the thick thickness of the insulating layer 32, the insulating layer 32 is etched to form the third protrusion(s), and then the first protrusion 34(s) will be formed naturally on the second protective layer 33 formed on the side of the insulating layer 32 away from the substrate. Moreover, the material of the insulating layer 32 may be photoresist, so that only exposure development is required to form the third protrusion(s) and the second sub-via hole 321 on the insulating layer 32, which saves process steps. If the third protrusion(s) is formed on other film layers, etching of other film layers with photoresist as a mask is also required after exposure development.

The insulating layer 32 is provided with a plurality of third protrusions on one side away from the first substrate 1, and the height of the sidewall of the third protrusion in the third direction Z decreases as the distance from the center of the third protrusion on the first surface increases. The first surface is parallel to the surface of the first substrate 1 close to the switch layer group 2, i.e., the first surface is a plane formed by the first direction X and the second direction Y, and the third direction Z is perpendicular to the first surface. For example, the sidewall of the third protrusion may be provided as an arc surface, and the arc surface may be a circular arc surface, an elliptical arc surface, and so on, specifically, the third protrusion may be provided as a spherical cap, an elliptical cap, and so on. The sidewall of the third protrusion can also be provided as an oblique surface, specifically, in order to ensure that the second protrusion(s) formed subsequently has a sufficient reflective surface, the third protrusion can be provided without an upper top surface, i.e., the third protrusion can be provided as any kind of pyramid structure.

The second protective layer 33 is disposed on the side of the insulating layer 32 away from the first substrate 1, and a portion of the second protective layer 33 covers the wall of the second sub-via hole 321. The second protective layer 33 is provided with a third sub-via hole 331, and the third sub-via hole 331 is interconnected to the second sub-via hole 321 and the first sub-via hole 311, so that the third sub-via hole 331 is interconnected to the first shading layer 21. The first sub-via hole 311, the second sub-via hole 321 and the third sub-via hole 331 form the first via hole 35, and the first via hole 35 is interconnected to the first shading layer 21. The material of the second protective layer 33 may be an inorganic material, which may be the same as the material of the first protective layer 31, for example, it may be silicon nitride, siliconoxide, and so on. The first protective layer 31 and the second protective layer 33 can play a protective role for the insulating layer 32. The thickness of the second protective layer 33 is greater than or equal to 50 nm and less than or equal to 350 nm.

Since the thickness of the second protective layer 33 is thin, a plurality of first protrusions 34 are formed on the surface of the second protective layer 33 away from the first substrate 1, and one first protrusion 34 is provided corresponding to the third protrusion described above, i.e., the first protrusion 34 is located on the side of the third protrusion away from the first substrate 1. The height of the sidewall of the first protrusion 34 in the third direction Z also decreases as the distance from the center of the first protrusion 34 on the first surface increases. For example, the surface of the first protrusion 34 away from the first substrate 1 may be provided as an arc surface, and in the case where the sidewall of the third protrusion is a circular arc surface, an elliptical arc surface, etc., correspondingly, the sidewall of the first protrusion 34 is a circular arc surface, an elliptical arc surface, etc. In the case where the third protrusion is provided as a spherical cap, an elliptical cap, etc., correspondingly, the first protrusion 34 is provided as a spherical cap, an elliptical cap, etc. The surface of the first protrusion 34 away from the first substrate 1 may also be provided as an oblique surface, and in the case where the third protrusion is provided as any kind of pyramid structure, correspondingly, the first protrusion 34 is also provided as any kind of pyramid structure.

In other exemplary embodiments of the present disclosure, the insulating layer group 3 may include only the insulating layer 32 and the second protective layer 33, or only the insulating layer 32. The insulating layer group 3 may include additional layers of insulating material, for example, a passivation layer, a buffer layer, and so on. The protrusion(s) may be provided in any thicker layer.

A first connection part 38 is connected between adjacent first protrusions 34, and the height of the first protrusion 34 in the third direction Z is higher than the height of the first connection part 38 in the third direction Z. The orthographic projection of the first protrusion 34 and the first connection part 38 on the first substrate 1 are located within the orthographic projection of the first shading layer 21 on the first substrate 1. The first connection part 38 is provided corresponding to the first part 511.

For example, the orthographic projection of the first shading layer 21 on the first substrate 1 may continuously cover the orthographic projection of two first protrusions 34 and the first connection part 38 between the two first protrusions 34 on the first substrate 1. Of course, the orthographic projection of the first shading layer 21 on the first substrate 1 may continuously cover the orthographic projection of three or more first protrusions 34 and the first connection parts 38 between the three or more first protrusions 34 on the first substrate 1.

The area of the orthographic projection of the first protrusions 34 on the first substrate 1 is more than 80% of the area of the orthographic projection of the first shading layer 21 on the first substrate 1. For example, the area of the orthographic projection of the first protrusions 34 on the first substrate 1 is 85%, 90%, 95%, etc., of the area of the orthographic projection of the first shading layer 21 on the first substrate 1. Alternatively, the area of the orthographic projection of the first protrusions 34 on the first substrate 1 may also be 100% of the area of the orthographic projection of the first shading layer 21 on the first substrate 1.

The insulating layer group 3 is prepared by: forming the first protective layer 31 and the insulating layer 32 on the side of the source and drain layer 27 away from the first substrate 1, then patterning the insulating layer 32 to form the second sub-via hole 321 and forming a plurality of third protrusions on the surface of the insulating layer 32 away from the first substrate 1; forming the second protective layer 33 on the side of the insulating layer 32 away from the first substrate 1, wherein a portion of the second protective layer 33 will cover the bottom and the sidewall of the second sub-via hole 321 since the second sub-via hole 321 has been formed on the insulating layer 32; and finally, patterning the first protective layer 31 and the second protective layer 33 to form the first sub-via hole 311 and the third sub-via hole 331, wherein the patterning process is performed on the first protective layer 31 and the second protective layer 33 in the second sub-via hole 321. Therefore, the orthographic projection of the first sub-via hole 311 on the first substrate 1 is located within the orthographic projection of the second sub-via hole 321 on the first substrate 1, and the orthographic projection of the third sub-via hole 331 is located with the orthographic projection of the second sub-via hole 321 on the first substrate 1. Of course, in other exemplary embodiments of the present disclosure, the first protective layer 31 and the second protective layer 33 may also be patterned separately in two stages, i.e., after forming the second sub-via hole 321, the first protective layer 31 is patterned to form the first sub-via hole 311, then the second protective layer 33 is formed, and finally the second protective layer 33 is patterned to form the third sub-via hole 331.

When the first sub-via hole 311, the second sub-via hole 321 and the third sub-via hole 331 are formed by the same patterning process on the first protective layer 31, insulating layer 32 and the second protective layer 33, undercut phenomenon is easy to occur due to the material of the first protective layer 31 is soft, the insulating layer 32 is thick, the etching time is long, and the first protective layer 31 is disposed at the bottom layer, resulting in process difficulties. Therefore, the insulating layer 32 is first patterned to form the second sub-via hole 321, and then the first protective layer 31 and the second protective layer 33 are patterned at the second sub-via hole 321 to form the first sub-via hole 311 and the third sub-via hole 331, in which case, after removing the insulating layer 32, the thickness of the first protective layer 31 and the thickness of the second protective layer 33 are both thinner, the etching time is shorter, and the undercut phenomenon is not easy to occur, reducing the process difficulty. Moreover, the material of the insulating layer 32 may be photoresist, and only exposure development is required to form the third protrusion and the second sub-via hole 321 on the insulating layer 32, and etching is not required.

Continue to refer to FIG. 3, the insulating layer group 3 includes a first plane 36 on the surface of the insulating layer group 3 away from the first substrate 1, and the orthographic projection of the first plane 36 on the first substrate 1 overlaps with the orthographic projection of the channel part 263 on the first substrate 1. For example, it may be that the orthographic projection of the first plane 36 on the first substrate 1 coincides with the orthographic projection of the channel part 263 on the first substrate 1, or it may be that the edge of the orthographic projection of the first plane 36 on the first substrate 1 is located inside the edge of the orthographic projection of the channel part 263 on the first substrate 1, or it may be that a portion of the orthographic projection of the first plane 36 on the first substrate 1 overlaps with a portion of the orthographic projection of the channel part 263 on the first substrate 1.

Specifically, the surface of the insulating layer 32 away from the first substrate 1 may include a third plane, and the orthographic projection of the third plane on the first substrate 1 overlaps with the orthographic projection of the channel part 263 on the first substrate 1. For example, it may be that the orthographic projection of the third plane on the first substrate 1 coincides with the orthographic projection of the channel part 263 on the first substrate 1, or it may be that the edge of the orthographic projection of the third plane on the first substrate 1 is located inside the edge of the orthographic projection of the channel part 263 on the first substrate 1, or it may be that a portion of the orthographic projection of the third plane on the first substrate 1 overlaps with a portion of the orthographic projection of the channel part 263 on the first substrate 1. The second protective layer 33 is disposed on the side of the insulating layer 32 away from the first substrate 1, so that the first plane 36 is formed on the surface of the second protective layer 33 away from the first substrate 1. Moreover, since the third protrusion(s) on the insulating layer 32 is formed by etching of the insulating layer 32, the third plane can be formed without etching the insulating layer 32 at the third plane, and the third plane is protruding with respect to the surroundings. The second protective layer 33 formed subsequently has a certain flattening effect on the surface of the insulating layer 32 away from the first substrate 1, so that in the case where the second protective layer 33 is thin, the orthographic projection of the first plane 36 on the first substrate 1 substantially coincides with the orthographic projection of the third plane on the first substrate 1; in the case where the second protective layer 33 is thick, the orthographic projection of the first plane 36 on the first substrate 1 is located on the inside the orthographic projection of the third plane on the first substrate 1.

In other words, a portion of the insulating layer group 3 corresponding to the channel part 263 on the surface of the insulating layer group 3 away from the first substrate 1 is the first plane 36. Specifically, the insulating layer 32 has a flat surface corresponding to the channel part 263 on the side of the insulating layer 32 away from the first substrate 1, and the second protective layer 33 subsequently formed also has a flat surface corresponding to the channel part 263 on the side of the second protective layer 33 away from the first substrate 1.

The array substrate 100 may also include a spacer 8, the spacer 8 being provided on the side of the first plane 36 away from the first substrate 1. Since the spacer 8 is used to support the color film substrate 200, a flatter support plane needs to be provided, and therefore a flatter base plane needs to be provided for the spacer 8. The third protrusion will cause the base plane for the spacer 8 to be uneven, so that the first plane 36 is provided as the flatter base plane for the spacer 8. Therefore, when the spacer 8 is provided in other positions, the first plane 36 can also be provided in corresponding positions.

Figure 9:
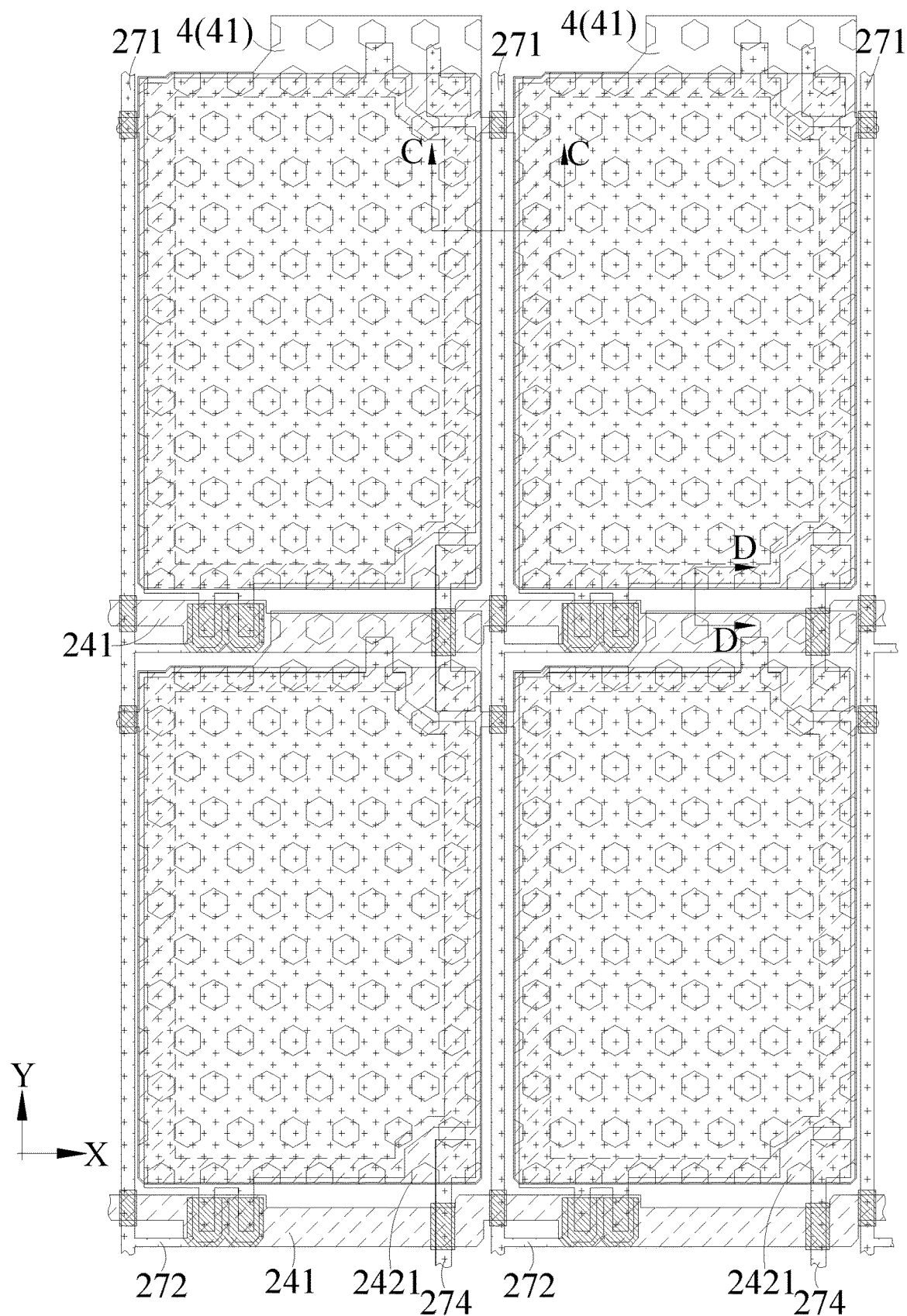
FIG. 9 is a schematic diagram of a structure after a first electrode is formed on the basis of FIG. 7.

Continue to refer to FIG. 3 and FIG. 9, in this exemplary embodiment, a first electrode layer 4 is disposed on the side of the insulating layer group 3 away from the first substrate 1 such that the first electrode layer 4 is located between the insulating layer group 3 and the reflective layer 5. The first electrode layer 4 includes a plurality of first electrodes 41, and the first electrode 4 is connected to the first shading layer 21 through the first via hole 35. The first electrode 4 may be a pixel electrode, and the first shading layer 21 and the second sub-electrode directly form a Cst capacitance, so as not to increase the stray capacitance.

The material of the first electrode layer 4 may be Indium Tin Oxide (ITO). Of course, it may also be other transparent conductive oxides such as Indium Zinc Oxide (IZO). The thickness of the first electrode layer 4 is greater than or equal to 30 nm and less than or equal to 100 nm. Since the thin thickness of the first electrode layer 4, a plurality of fourth protrusions are formed on the surface of the second protective layer 33 away from the first substrate 1. The fourth protrusion is provided corresponding to the first protrusion 34 described above. That is, the fourth protrusion is located on the side of the first protrusion 34 away from the first substrate 1; and the height of the sidewall of the fourth protrusion in the third direction Z also decreases as the distance from the center of the fourth protrusion on the first surface increases. For example, the surface of the fourth protrusion away from the first substrate 1 may be provided as an arc surface, and in the case where the sidewall of the first protrusion 34 is a circular arc surface, an elliptical arc surface, etc., correspondingly, the sidewall of the fourth protrusion is a circular arc surface, an elliptical arc surface, etc. In the case where the first protrusion 34 is provided as a spherical cap, an elliptical cap, etc., correspondingly, the fourth protrusion is provided as a spherical cap, an elliptical cap, etc. The surface of the fourth protrusion away from the first substrate 1 may also be provided as an oblique surface, and in the case where the first protrusion 34 is provided as any kind of pyramid structure, correspondingly, the fourth protrusion is also provided as any kind of pyramid structure.

Figure 10:
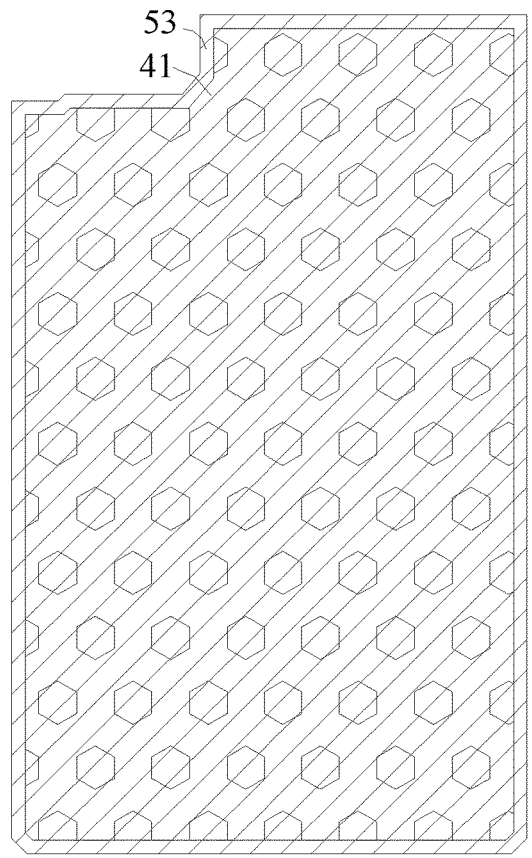
FIG. 10 is a schematic diagram of a structure after a reflective layer is formed on the first electrode.

Referring to FIG. 3 and FIG. 10, a reflective layer 5 is provided on the side of the first electrode layer 4 away from the first substrate 1, and the material of the reflective layer 5 may be metal. The thickness of the reflective layer 5 is greater than or equal to 50 nm and less than or equal to 300 nm. Since the thickness of the reflective layer 5 is thin, a plurality of second protrusions 51 are formed on the surface of the reflective layer 5 away from the first substrate 1, and the second protrusion 51 is provided corresponding to the fourth protrusion described above. That is, the second protrusion 51 is located on the side of the fourth protrusion away from the first substrate 1, and the height of the sidewall of the second protrusion 51 in the third direction Z also decreases as the distance from the center of the second protrusion 51 on the first surface increases. For example, the surface of the second protrusion 51 away from the first substrate 1 may be provided as an arc surface, and in the case where the sidewall of the fourth protrusion is a circular arc surface, an elliptical arc surface, etc., correspondingly, the sidewall of the second protrusion 51 is a circular arc surface, an elliptical arc surface, etc. In the case where the fourth protrusion is provided as a spherical cap, an elliptical cap, etc., correspondingly, the second protrusion 51 is provided as a spherical cap, an elliptical cap, etc. The surface of the second protrusion 51 away from the first substrate 1 may also be provided as an oblique surface, and in the case where the fourth protrusion is provided as any kind of pyramid structure, correspondingly, the second protrusion 51 is also provided as any kind of pyramid structure.

Figure 11:
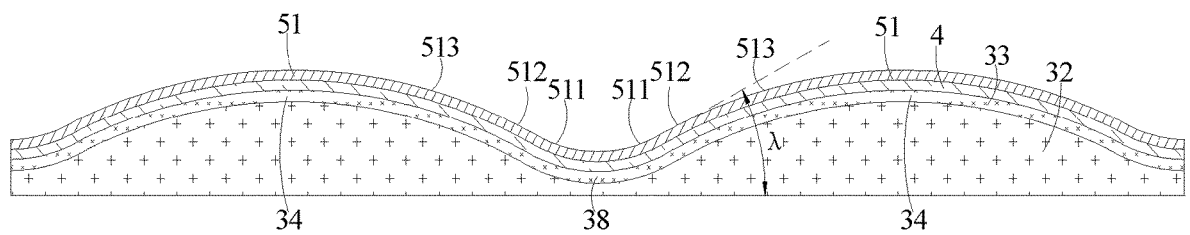
FIG. 11 is a partial enlarged schematic diagram of two second protrusions in FIG. 3.

Specifically, referring to FIG. 11, the sidewall of the second protrusion 51 may include a first part 511, a second part 512, and a third part 513 that are smoothly connected in sequence. The first part 511 is closer to the first substrate than the third part 513, and the first part 511 and the third part 513 are provided as curved surfaces. The radius of curvature of the first part 511 may be smaller than the radius of curvature of the third part 513, the first part 511 may be provided as a concave shape, and the third part 513 may be provided as a protruding shape. The second part 512 is provided as an inclined surface. Specifically, a portion of the sidewall of the second protrusion 51 close to the first substrate may be a circular arc surface, a middle portion of the sidewall of the second protrusion 51 may be provided as an inclined surface, and a portion of the sidewall of the second protrusion 51 away from the first substrate may be a circular arc surface.

The first parts 511 of the plurality of second protrusions 51 are smoothly connected, specifically, the first parts 511 of the plurality of second protrusions 51 are smoothly connected at the bottom of the second protrusions 51; and the third parts 513 of the same second protrusion 51 are smoothly connected at the top of the second protrusion 51. In this way, the second protrusions 51 form the diffuse reflective surface at all places to improve the reflective efficiency of the reflective layer 5 and ensure the display effect.

The area of the orthographic projection of the first shading layer 21 on the first substrate 1 accounts for 60% to 100% of the area of the orthographic projection of the reflective part 53 on the first substrate 1. For example, the area of the orthographic projection of the first shading layer 21 on the first substrate 1 accounts for 85% to 95% of the area of the orthographic projection of the reflective part 53 on the first substrate 1, specifically, it may be 86%, 88%, 90%, 91%, 93.5%, and the like.

The angle between the sidewall of the second protrusion 51 and the first surface is greater than or equal to 6° and less than or equal to 13°. For example, the angle between the sidewall of the second protrusion 51 and the first surface may be 7.5°, 9°, 9.5°, 10°, 10.5°, 12°, etc. The reflective layer 5 has the highest reflectivity in this range.

Referring to FIG. 11, in the case where the surface of the second protrusion 51 away from the first substrate 1 is provided as a curved surface, the angle between the sidewall of the second protrusion 51 and the first surface refers to the angle 2 between the tangent line of the end of the second protrusion 51 close to the first substrate and the first surface.

Referring to FIG. 10, the shape of the first electrode 41 may be the same as the shape of the reflective part 53, i.e., the shape of the orthographic projection of the first electrode 41 on the first substrate 1 may be the same as the shape of the orthographic projection of the reflective part 53 on the first substrate 1. The orthographic projection of the first electrode 41 on the first substrate 1 is located within the orthographic projection of the reflective part 53 on the first substrate 1, for example, the orthographic projection of the first electrode 41 on the first substrate 1 overlaps with the orthographic projection of the reflective part 53 on the first substrate 1, or it may be that the edge of the orthographic projection of the first electrode 41 on the first substrate 1 is located within the edge of the orthographic projection of the reflective part 53 on the first substrate 1, and there is a spacing between the edge of the orthographic projection of the first electrode 41 on the first substrate 1 and the edge of the orthographic projection of the reflective part 53 on the first substrate 1. The width of the spacing is greater than or equal to 1 micron and less than or equal to 5 microns, for example, the width of the spacing may be 2 microns, 3 microns, 4.5 microns, etc. In this way, it is possible to avoid errors in the preparation of the first electrode 4 and the reflective part 53 that result in the reflective part 53 not covering the first electrode 4.

In addition, in some other exemplary embodiments of the present disclosure, the orthographic projection of the reflective part 53 on the first substrate 1 may also be located within the orthographic projection of the first electrode 41 on the first substrate 1, i.e., the edge of the first electrode 41 is not covered by the reflective part 53. Since the material of the first electrode 41 is ITO, the first electrode 41 is easy to crystallize when the temperature rises during the process of deposition formation, and after etching the first electrode 41, there will also be some residues to form residual sand. If the reflective part 53 covers the position where the first electrode 41 is etched, due to the existence of residual sand, the reflective layer 5 is easy to form a bulge at the residual sand, resulting in abnormal reflectivity and abnormal display. Therefore, when the edge of the first electrode 41 is not covered by the reflective part 53, the reflective part 53 will not cover the residual sand and no bulge will be formed due to the residual sand, and the reflectivity will be normal, so that the display panel displays normally.

The orthographic projection of the first electrode 5 on the first substrate 1 overlaps with the orthographic projection of the grid line 241 on the first substrate 1; i.e., the first electrode 5 not only covers the first shading layer 21, but also the first electrode 5 protrudes toward the grid line 241 and overlaps a portion of the grid line 241. The orthographic projection of the reflective part 53 on the first substrate 1 overlaps with the orthographic projection of the gate line 241 on the first substrate, i.e., the reflective part 53 not only covers the first shading layer 21, but also the reflective part 53 protrudes toward the gate line 241 side and overlaps with a part of the gate line 241. By making the area of the reflective part 53 as large as possible, the reflective area is increased, thereby increasing the reflectivity and thus improving the display effect.

Figure 12:
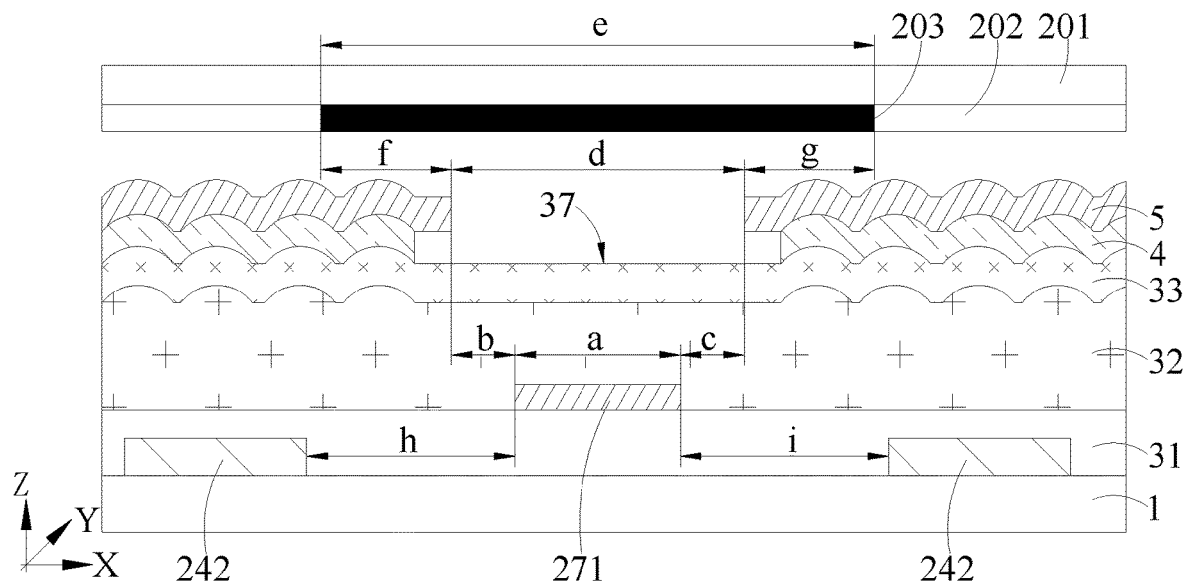
FIG. 12 is a cross-sectional schematic view after sectioning in accordance with C-C in FIG. 9.
Figure 13:
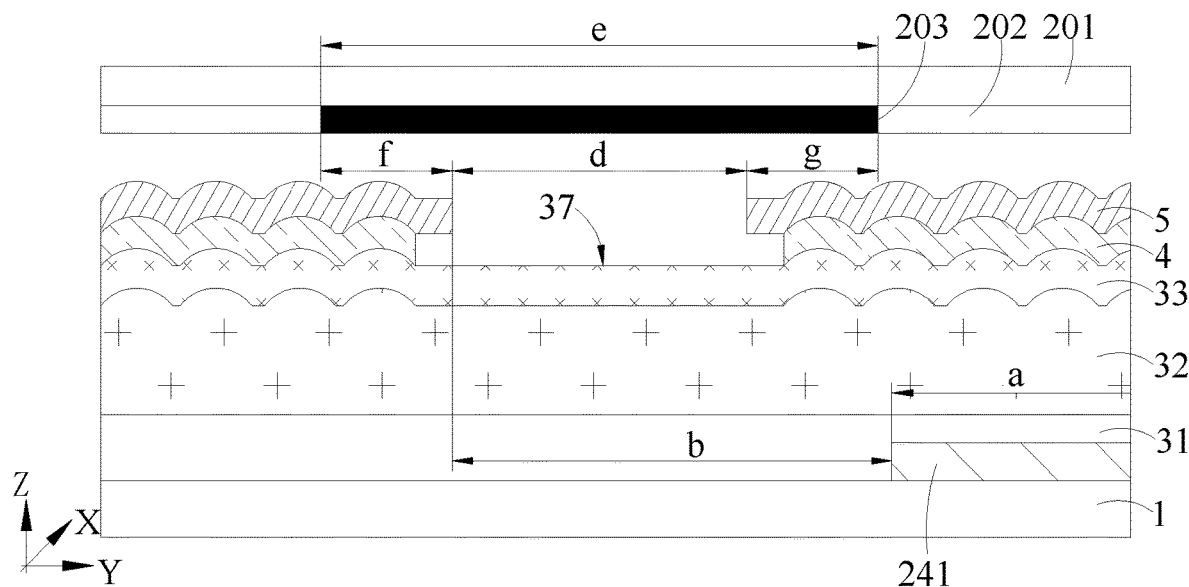
FIG. 13 is a cross-sectional schematic view after sectioning in accordance with D-D in FIG. 9.

Referring to FIG. 12 and FIG. 13, the surface of the insulating layer group 3 away from the first substrate 1 may also include a second plane 37. The orthographic projection of the second plane 37 on the first substrate 1 is located within the orthographic projection of the spacing between two adjacent first electrodes 4 on the first substrate 1.

The second plane 37 may include a plurality of first sub-planes extending along the first direction X and a plurality of second sub-planes extending along the second direction Y. The width of the first sub-plane, perpendicular to the first direction X, is greater than or equal to 1 micron and less than or equal to 12 microns, for example, it may be 5 microns, 6 microns, 8 microns, etc. The width of the second sub-plane, perpendicular to the second direction Y, is greater than or equal to 4 microns and less than equal to 8 microns, for example, it may be 6 microns. The plurality of first sub-planes and the plurality of second sub-planes are crossed to form a grid-like structure, and a plurality of first protrusions 34 are provided in each grid.

Specifically, the surface of the insulating layer 32 away from the first substrate 1 may include a fourth plane. The orthographic projection of the fourth plane on the first substrate 1 is located within the orthographic projection of the spacing between the two adjacent first electrodes 4 on the first substrate 1. The orthographic projection of the fourth plane on the first substrate 1 may coincide with the orthographic projection of the spacing between the two adjacent first electrodes 4 on the first substrate 1, or the orthographic projection of the fourth plane on the first substrate 1 may be located inside the orthographic projection of the spacing between the two adjacent first electrodes 4 on the first substrate 1. The second protective layer 33 is disposed on the side of the insulating layer 32 away from the first substrate 1, so that the second plane 37 is formed on the surface of the second protective layer 33 away from the first substrate 1. Moreover, since the third protrusion(s) on the insulating layer 32 is formed by etching of the insulating layer 32, the fourth plane can be formed without etching the insulating layer 32 at the fourth plane, and the fourth plane is protruding with respect to the surroundings. The second protective layer 33 formed subsequently has a certain flattening effect on the surface of the insulating layer 32 away from the first substrate 1, so that in the case where the second protective layer 33 is thin, the orthographic projection of the fourth plane on the first substrate 1 substantially coincides with the orthographic projection of the second plane 37 on the first substrate 1; in the case where the second protective layer 33 is thick, the orthographic projection of the fourth plane on the first substrate 1 is located on the inside the orthographic projection of the second plane 37 on the first substrate 1. Of course, the second plane 37 can also be formed by etching, as shown in FIGS. 12 and 13.

Since the reflective layer 5 is directly disposed on the side of the first electrode 4 away from the first substrate 1, and the material of the reflective layer 5 is silver (Ag), which is electrically conductive, the reflective layer 5 will be energized after energizing the first electrode 4. If the first protrusion 34 is also provided in the spacing between two adjacent pixel regions, the surface of the reflective material layer in the spacing is uneven, and when the reflective material layer is etched to form different reflective parts 53 of different pixels, the photoresist located in the recessed portion of the spacing is not easily removed, resulting in the reflective material layer also not being etched away, thus causing the pixel electrodes of two adjacent sub-pixels to be connected to each other, resulting in a poor highlight.

After the second plane 37 is provided, the surface for forming the reflective material layer in the second plane 37 is relatively flat, and when the reflective material layer is etched to form different reflective parts 53 of different pixels, the photoresist located in the second plane 37 is easily removed and the reflective material layer is etched away, so that there is a spacing between two adjacent reflective parts 53, and the pixel electrodes of two adjacent sub-pixels do not connected to each other and will not lead to poor highlight.

It should be noted that the first plane 36 and the second plane 37, as described above, are not absolutely flat and have a certain roughness. The "plane" or "flat surface" refers mainly to the absence of the first protrusion 34 at the first plane 36 and the second plane 37, compared to the other positions of the insulating layer group 3 where the first protrusion 34 is provided, which makes the first plane 36 and the second plane 37 flatter.

In addition, in some other exemplary embodiments of the present disclosure, the first protrusion 34 and the reflective layer 5 can be provided between two adjacent pixels, and the second protrusion 51 is provided on the reflective layer 5, and the first protrusion 34 and the reflective layer 5 are not provided only in the area opposite to the thin film transistor and the first vias 35, and, of course, the second protrusion 51 is not formed. The area of the reflective layer 5 can be increased to improve the display effect.

Figure 14:
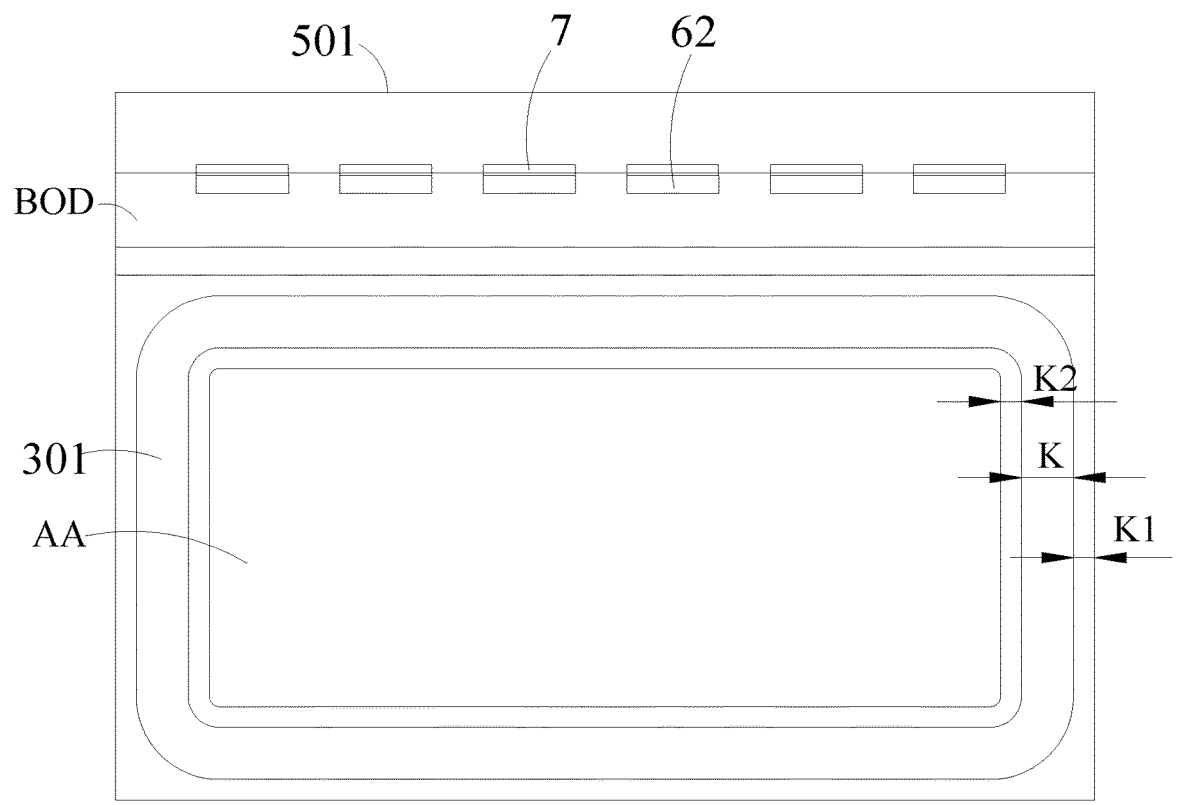
FIG. 14 is a top schematic view of an array substrate of the present disclosure.
Figure 15:
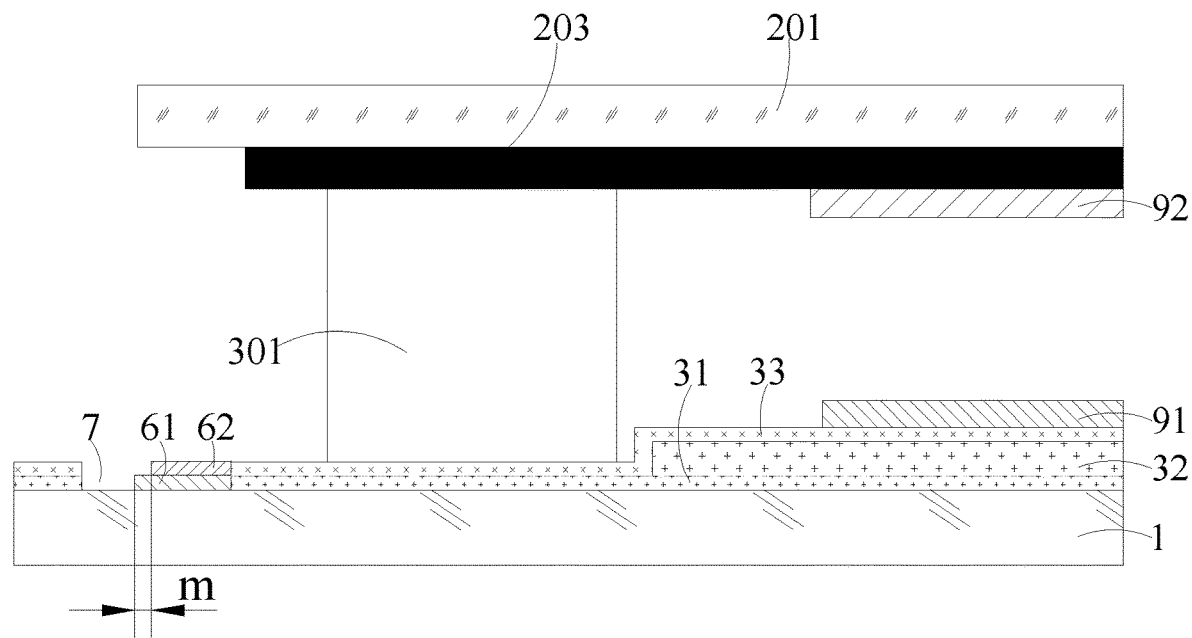
FIG. 15 is a cross-sectional schematic view of a display panel of the present disclosure in a non-display area.

The structure of the display area AA is described in detail above. Referring to FIG. 14 and FIG. 15, the array substrate 100 may further include a plurality of first bonding pins 61 and a plurality of second bonding pins 62 in the bonding area BOD. The first bonding pin 61 is provided on the same layer and of the same material as the gate layer 24 or the source and drain layer 27. The plurality of second bonding pins 62 are located on the side of the plurality of first bonding pins 61 away from the first substrate 1 and in one-to-one correspondence with the plurality of first bonding pins 61. The second bonding pin 62 is provided on the same layer and of the same material as the first electrode 4. The orthographic projection of the second bonding pin 62 on the first substrate 1 is located within the orthographic projection of the first bonding pin 61 on the first substrate 1, and there is a gap between the edge, of the orthographic projection of the second bonding pin 62 on the first substrate 1 away from the display area AA, and the edge of the orthographic projection of the first bonding pin 61 on the first substrate 1 away from the display area AA. That is, the second bonding pin 62 is inwardly retracted toward the display area AA, and the gap is a distance m between the end of the second bonding pin 62 away from the display area AA and the end of the first bonding pin 61 away from the display area AA, the width of which is greater than or equal to 1.5 microns and less than or equal to 3.5 microns, for example, it may be 2 microns, 2.5 microns, 3 microns, and so on. In this way, warping of the second bonding pin 62 can be avoided.

A groove 7, provided in the bonding area BOD penetrating the first protective layer 31 and the second protective layer 33, is located on the side of the first bonding pin 61 away from the display area AA, i.e., the groove 7 is located on the side of the first bonding pin 61 close to the cutting line 501. Since the first protective layer 31 and the second protective layer 33 will be cracked when cutting the array substrate 100, the groove 7 can be provided to block the extension of the cracks to the first bonding pin 61, thus avoiding the cracking of the first bonding pin 61 and ensuring the electrical performance of the first bonding pin 61.

The array substrate 100 may also include a test trace, and the distance between the test trace and the cutting line of the array substrate 100 is greater than or equal to 0.2 mm and less than or equal to 0.3 mm, which is set to prevent the test trace from being scratched during cutting.

Figure 16:
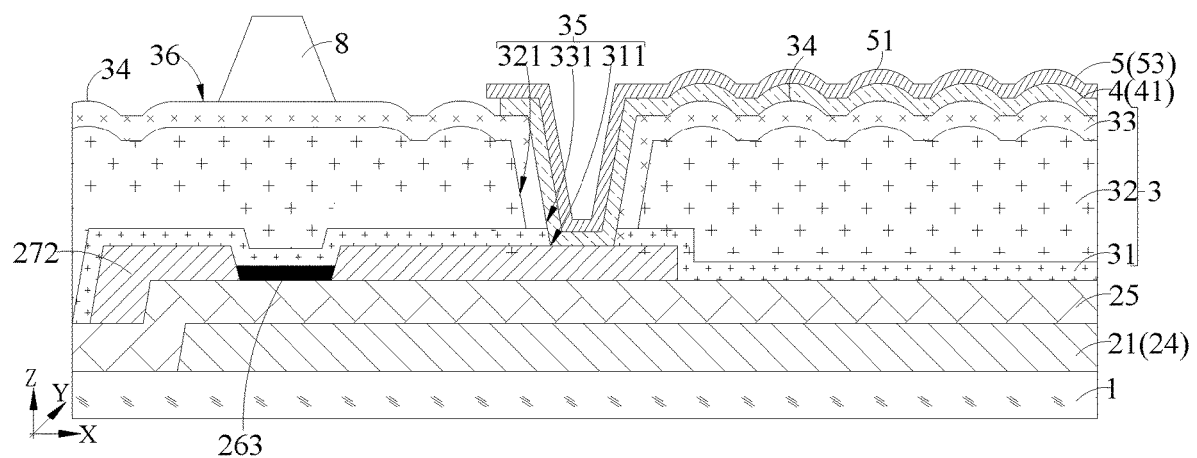
FIG. 16 is a schematic diagram of a structure according to a second exemplary embodiment of the present disclosure.
Figure 17:
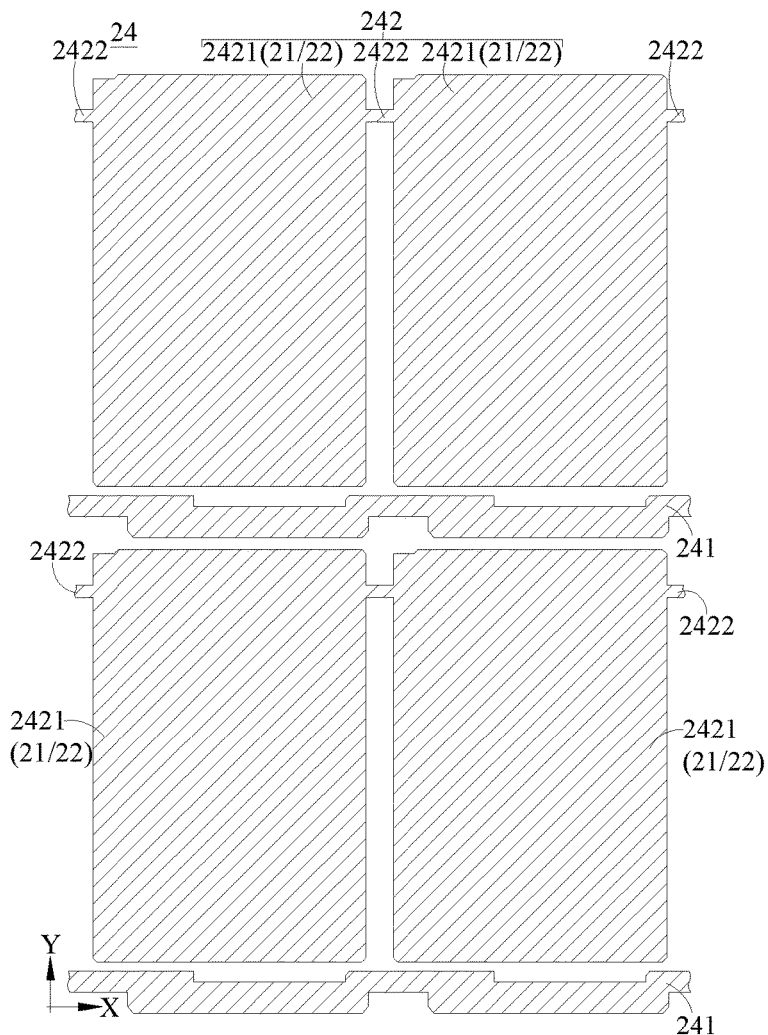
FIG. 17 is a structural schematic diagram of a gate layer in FIG. 16 according to an exemplary embodiment.

In another exemplary embodiment of the present disclosure, the first shading layer 21 may be disposed on the same layer and of the same material as the gate layer 24 with reference to FIGS. 16 and 17. The gate layer 24 may include a plurality of gate lines 241, a plurality of second sub-electrodes 2421, and a plurality of connection parts 2422. The second sub-electrode 2421 may be provided in a frame shape, for example, the second sub-electrode 2421 may be provided in a rectangular frame. The gate line 241 extends along the first direction X, the first direction X being parallel to the surface of the first substrate 1 close to the switch layer group 2, and a portion of the gate line 241 may serve as a gate. The plurality of second sub-electrodes 2421 are arranged in an array, and some second sub-electrodes 2421 arranged along the first direction X form a row of second sub-electrodes 2421. A gate line 241 is provided between two adjacent rows of second sub-electrodes 2421, i.e., the gate line 241 is provided on the side of the second sub-electrodes 2421 in the second direction Y. The connection part 2422 is connected between two adjacent second sub-electrodes 2421 arranged along the first direction X, i.e., a plurality of second sub-electrodes 2421 in the same row are connected to each other by the connection parts 2422.

The first shading layer 21 is provided in the frame, and may be provided in a rectangular sheet shape. The outer edge of the first shading layer 21 may be integrated with the inner edge of the second electrode 242, so that the first shading layer 21 and the second electrode 242 form a rectangular sheet shape. In this way, it avoids the problem that the larger area of the second sub-electrode 2421 increases the storage capacitance formed by the second sub-electrode 2421 and the source and drain layer, in which leads to a long charging time or failure to be fully charged.

Figure 18:
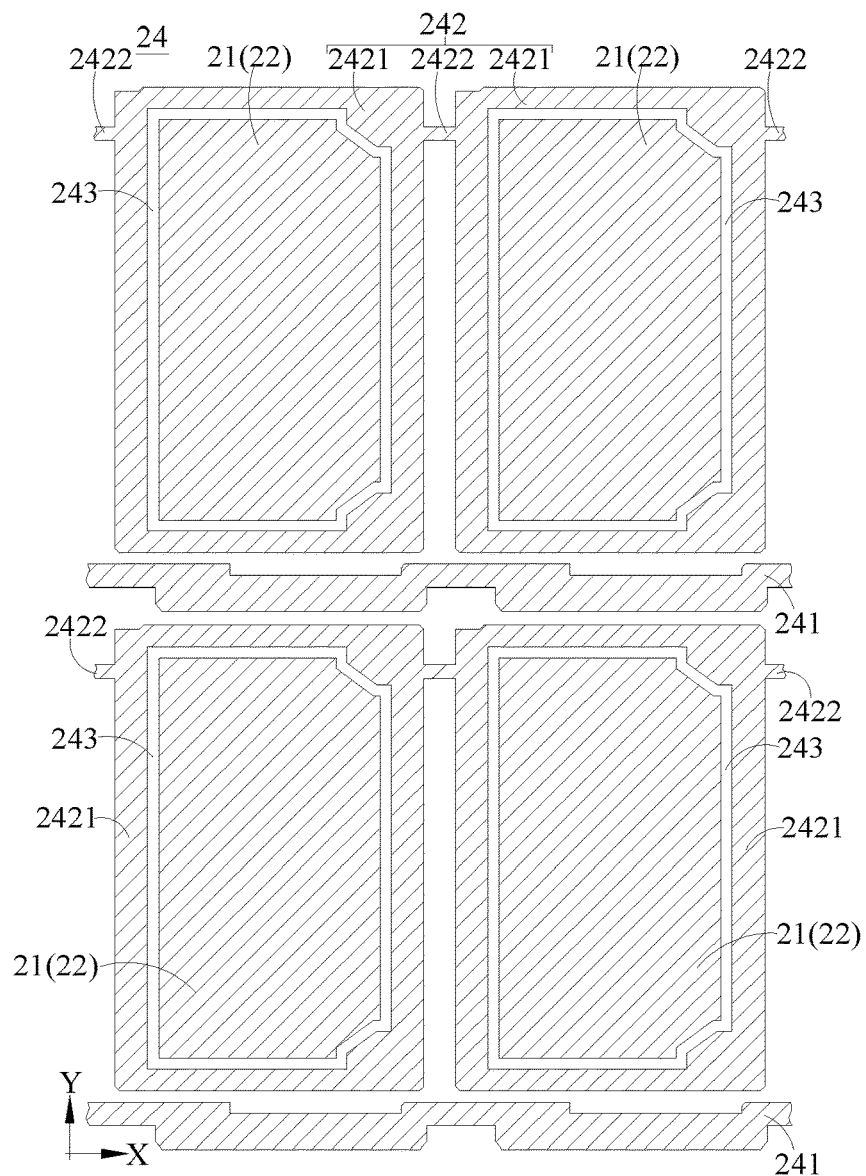
FIG. 18 is a structural schematic diagram of the gate layer in FIG. 16 according to another exemplary embodiment.

Of course, in some other exemplary embodiments of the present disclosure, with reference to FIG. 18, a second gap 243 is provided between the first shading layer 21 and the second sub-electrode 2421, so that the first shading layer 21 is insulated from the second electrode 242 and will not be energized in the case of energizing the second electrode 242 to avoid the first shading layer 21 affecting the capacitance of the array substrate 100. In addition, the width of the second gap 243 can be made as narrow as the process conditions can achieve, making the area of the first shading layer 21 as large as possible and blocking as much light as possible.

In this case, the source and drain layer 27 may include a source 272, a drain 273, a data line 271 and a second electrode connection part 274. The area of the portion set as the first shading layer 21 in the above embodiment can be set smaller, as long as it can be connected to the first electrode 4.

Figure 19:
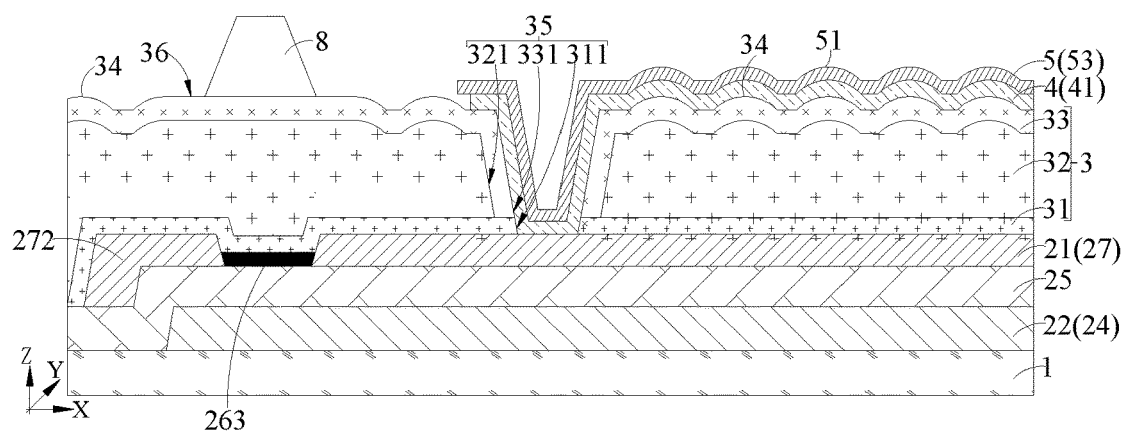
FIG. 19 is a schematic diagram of a structure according to a third exemplary embodiment of the present disclosure.

In another exemplary embodiment of the present disclosure, with reference to FIG. 19, two shading layers may be provided, i.e., the first shading layer 21 and the second shading layer 22. The first shading layer 21 may be disposed on the same layer and of the same material as the source drain layer 27. The specific structure of the first shading layer 21 has been described in detail above, so it will not be repeated here.

The second shading layer 22 may be disposed on the same layer and of the same material as the gate layer 24. That is, the gate layer 24 may include a plurality of second shading layers 22, a plurality of gate lines 241, a plurality of second sub-electrodes 2421, and a plurality of connection parts 2422. The second sub-electrode 2421 may be provided in a frame shape, for example, the second sub-electrode 2421 may be provided in a rectangular frame.

The second shading layer 22 is provided in the frame, and may be provided in a rectangular sheet shape. The outer edge of the second shading layer 22 may be integrated with the inner edge of the second electrode 242, so that the second shading layer 22 and the second electrode 242 form a rectangular sheet shape.

Of course, in some other exemplary embodiments of the present disclosure, a second gap 243 is provided between the second shading layer 22 and the second sub-electrode 2421, so that the second shading layer 22 is insulated from the second electrode 242 and will not be energized in the case of energizing the second electrode 242 to avoid the second shading layer 22 affecting the capacitance of the array substrate 100. In addition, the width of the second gap 243 can be made as narrow as the process conditions can achieve, making the area of the second shading layer 22 as large as possible and blocking as much light as possible.

Based on the same inventive idea, the exemplary embodiments of the present disclosure provide a display panel, which may include an array substrate 100, a color film substrate 200, an adhesive frame 301, and a liquid crystal layer 302. The array substrate 100 is the array substrate 100 described in any of the above embodiments. The color film substrate 200 is disposed on the side of the array substrate 100 close to the reflective layer 5. The adhesive frame 301 is provided between the array substrate 100 and the color film substrate 200. The liquid crystal layer 302 is provided between the array substrate 100 and the color film substrate 200, and is located within the adhesive frame 301.

The specific structure of the array substrate 100 has been described in detail above, so it will not be repeated here.

In this exemplary embodiment, referring to FIG. 14, the orthographic projection of the adhesive frame 301 on the first substrate 1 and the orthographic projection of the insulating layer 32 on the first substrate 1 do not overlap, i.e., the insulating layer 32 is grooved and the second protective layer 33 covers the sidewall of the groove, so that it is compatible with black and white display. The width K of the adhesive frame 301 is about 1 mm, the distance K1 between the outer side of the adhesive frame 301 and the cutting line 501 at the side without the bonding area BOD is about 0.2 mm, and the distance K2 between the inner side of the adhesive frame 301 and the second protective layer 33 is about 0.2 mm.

Referring to FIG. 15, a first alignment film 91 is provided on the side of the array substrate 100 close to the color film substrate 200, and a second alignment film 92 is provided on the side of the color film substrate 200 close to the array substrate 100.

In this exemplary embodiment, the color film substrate 200 may include a second substrate 201, a light transmission part 202 and a shading part 203. The light transmission part 202 is provided on a side of the second substrate 201 close to the array substrate 100, and is provided opposite to the pixel region. The shading part 203 is provided on a side of the second substrate 201 close to the array substrate 100, and is provided opposite to the gap between the pixel regions. The orthographic projection of the shading part 203 on the second substrate 201 is located within the second substrate, i.e., the edge of the shading part 203 is not aligned with the edge of the second substrate 201, but is inwardly retracted relative to the edge of the second substrate 201.

Specifically, referring to FIG. 12, in a cross section perpendicular to the second direction Y, i.e., perpendicular to the data line 271, the width e of the shading part 203 is about 11 microns, the width a of the data line 271 is about 4 microns, the gap d between two adjacent reflective parts 53 is about 6 microns, the width f or g of the overlap of the shading part 203 and the reflective part 53 is about 2.5 microns, the distance b or c between the side of the data line 271 close to the reflective part 53 and the side of the reflective part 53 close to the data line 271 is about 1 micron, and the distance h or i between the side of the data line 271 close to the second electrode 242 and the side of the second electrode 242 close to the data line 271 is about 5.5 microns. In other exemplary embodiments of the present disclosure, the width a of the data line 271 is about 3.5 microns, the distance b or c between the side of the data line 271 close to the reflective part 53 and the side of the reflective part 53 close to the data line 271 is about 0.75 microns, and the distance h or i between the side of the data line 271 close to the second electrode 242 and the side of the second electrode 242 close to the data line 271 is about 7 microns.

Specifically, referring to FIG. 13, in the cross section perpendicular to the first direction X, i.e., perpendicular to the gate line 241, the width e of the shading part 203 is about 13 microns, the width a of the gate line 241 is about 21.2 microns, the gap d between two adjacent reflective parts 53 is about 6 microns, the width f or g of the overlap of the shading part 203 and the reflective part 53 is about 3.5 microns, and the distance b between the gate line 241 and the reflective part 53 of the adjacent pixel region is about 10.5 microns. In other exemplary embodiments of the present disclosure, the width a of the gate line 241 is about 22.2 microns, 3.5 microns, etc., and the distance b between the gate line 241 and the reflective part 53 of the adjacent pixel region is about 0.75 microns, etc.

Based on the same inventive idea, the embodiments of the present disclosure provide a display device, which may include the display panel as described in any of the above embodiments. The specific structure of the display panel has been described in detail above, and it will not be repeated here.

The specific type of the display device is not particularly limited, which can be the display device types commonly used in the field, for example, mobile devices such as cell phones, watches and other wearable devices, etc., and can be selected by those skilled in the art according to the specific use of the display device, and will not be repeated here.

It should be noted that the display device, in addition to the display panel, also includes other necessary parts and components. Taking the display as an example, the display device may also include housing, circuit boards, power lines, and so on, which can be added by those skilled in the art according to the specific requirements of the use of the display device, and will not be repeated here.

Compared with the prior art, the beneficial effects of the display device provided by the exemplary embodiments of the present application are the same as the beneficial effects of the array substrate 100 provided by the exemplary embodiments above and will not be repeated here.

Other embodiments of the present disclosure will be readily apparent to those skilled in the art upon consideration of the specification and practice of the invention disclosed herein. This application is intended to cover any variation, use, or adaptation of the present disclosure that follows the general principles of the present disclosure and includes commonly known or customary technical means in the art not disclosed herein. The specification and embodiments are to be considered exemplary only, and the true scope and spirit of the disclosure is indicated by the appended claims.

What is claimed is:

1. An array substrate, comprising:
   a first substrate;
   a switch layer group on one side of the first substrate, wherein the switch layer group comprises a plurality of switch units and a plurality of first shading layers; the plurality of first shading layers are spaced apart; and at least one first shading layer of the plurality of first shading layers is disposed on a same layer and of a same material as one layer in at least one switch unit of the plurality of switch units;
   an insulating layer group on one side of the switch layer group away from the first substrate, wherein a plurality of first protrusions are provided on one surface of the insulating layer group away from the first substrate; a first connection part is connected between adjacent first protrusions, and a height, in a third direction, of a first protrusion of the adjacent first protrusions is higher than a height, in the third direction, of the first connection part; and an orthographic projection of the first protrusion and the first connection part on the first substrate is within an orthographic projection of the at least one first shading layer on the first substrate, the third direction being perpendicular to one surface of the first substrate close to the switch layer group; and
   a reflective layer on one side of the insulating layer group away from the first substrate, wherein a plurality of second protrusions are provided on one surface of the reflective layer away from the first substrate; an orthographic projection of at least one first protrusion of the plurality of first protrusions on the first substrate is within an orthographic projection of at least one second protrusion of the plurality of second protrusions on the first substrate; and the reflective layer comprises a plurality of reflective parts, and the orthographic projection of the at least one first shading layer on the first substrate is within an orthographic projection of at least one reflective part of the plurality of reflective parts on the first substrate.

2. The array substrate of claim 1, wherein the switch layer group comprises:
   a gate layer on one side of the first substrate; a gate insulating layer on one side of the gate layer away from the first substrate; an active layer on one side of the gate insulating layer away from the first substrate; and a source and drain layer on one side of the active layer away from the first substrate, wherein the at least one first shading layer is disposed on the same layer and of the same material as the source and drain layer; or
   the switch layer group comprises: a source and drain layer, wherein the at least one first shading layer is disposed on the same layer and of the same material as the source and drain layer; a gate layer; and a plurality of second shading layers spaced apart, wherein at least one second shading layer of the plurality of second shading layers is disposed on a same layer and of a same material as the gate layer, and an orthographic projection of the at least one second shading layer on the first substrate is within the orthographic projection of the at least one reflective part on the first substrate; or
   the switch layer group comprises: a gate layer on one side of the first substrate, wherein the at least one first shading layer is disposed on the same layer and of the same material as the gate layer.

3. The array substrate of claim 2, wherein the gate layer comprises:

a plurality of gate lines extending in a first direction, the first direction being parallel to the surface of the first substrate close to the switch layer group;

a plurality of second sub-electrodes arranged in an array, wherein at least one second sub-electrode of the plurality of second sub-electrodes is provided in a frame shape; and a plurality of connection parts, wherein at least one connection part of the plurality of connection parts is connected between two adjacent second sub-electrodes arranged along the first direction.

4. The array substrate of claim 3, wherein an orthographic projection of the plurality of second protrusions overlaps with an orthographic projection of at least one gate line of the plurality of gate lines on the first substrate.

5. The array substrate of claim 3, wherein the active layer comprises:
a channel part on one side of a gate line of the plurality of gate lines away from the first substrate;
a first filling part spaced from the channel part, wherein the first filling part is on one side of a connection part of the plurality of connection parts away from the first substrate and covers at least a portion of a sidewall of the connection part; and
a second filling part spaced from the channel part, wherein the second filling part is on one side of the gate line away from the first substrate and covers at least a portion of a sidewall of the gate line.

6. The array substrate of claim 5, wherein the source and drain layer comprises:
a data line extending in a second direction, the second direction intersecting the first direction, wherein a first portion of the data line is on one side of the first filling part away from the connection part, and a second portion of the data line is on one side of a portion of the second filling part away from the gate line; wherein the at least one first shading layer is disposed on one side of the data line in the first direction, the orthographic projection of the at least one first shading layer on the first substrate is within an orthographic projection of a second sub-electrode of the plurality of second sub-electrodes on the first substrate;
a source, one end of the source being connected to the data line;
a drain, one end of the drain being connected to the at least one first shading layer; and
a second electrode connection part connected between two second sub-electrodes adjacent in the second direction, wherein a portion of the second electrode connection part is on one side of the other portion of the second filling part away from the gate line.

7. The array substrate of claim 6, wherein the source and drain layer further comprises:
a maintenance block connected to one side of the at least one first shading layer close to the gate line, wherein an orthographic projection of the maintenance block on the first substrate overlaps with an orthographic projection of the gate line on the first substrate.

8. The array substrate of claim 7, wherein the insulating layer group is provided with a first via hole; and the array substrate further comprises:
a first electrode layer between the insulating layer group and the reflective layer, wherein the first electrode layer comprises a plurality of first electrodes, and at least one first electrode of the plurality of first electrodes is connected to the first shading layer through the first via hole.

9. The array substrate of claim 8, wherein an orthographic projection of the at least one first electrode on the first substrate overlaps with the orthographic projection of the gate line on the first substrate; and an orthographic projection of at least one reflective part of the plurality of reflective parts on the first substrate overlaps with the orthographic projection of the gate line on the first substrate.

10. The array substrate of claim 8, wherein an orthographic projection of the at least one first electrode on the first substrate is within an orthographic projection of at least one reflective part of the plurality of reflective parts on the first substrate.

11. The array substrate of claim 8, wherein the insulating layer group comprises:
a first protective layer on one side of the source and drain layer away from the first substrate, wherein the first protective layer is provided with a first sub-via hole;
an insulating layer on one side of the first protective layer away from the first substrate, wherein the insulating layer is provided with a second sub-via hole; and
a second protective layer on one side of the insulating layer away from the first substrate, wherein a portion of the second protective layer covers a wall of the second sub-via hole, and the second protective layer is provided with a third sub-via hole, the first sub-via hole, the second sub-via hole and the third sub-via hole being interconnected to form the first via hole;
wherein an orthographic projection of the first sub-via hole on the first substrate is within an orthographic projection of the second sub-via hole on the first substrate, and an orthographic projection of the third sub-via hole on the first substrate is within the orthographic projection of the second sub-via hole on the first substrate.

12. The array substrate of claim 11, wherein a bonding area is provided on one side of a display area of the array substrate, and the array substrate further comprises:
a plurality of first bonding pins in the bonding area, wherein at least one first bonding pin of the plurality of first bonding pins is disposed on a same layer and of a same material as the gate layer or the source and drain layer; and
a plurality of second bonding pins in the bonding area, wherein at least one second bonding pin of the plurality of second bonding pins corresponds to the at least one first bonding pin and is on one side of the at least one first bonding pin away from the first substrate; the at least one second bonding pin is disposed on a same layer and of a same material as the at least one first gate; an orthographic projection of the at least one second bonding pin on the first substrate is located within an orthographic projection of the at least one first bonding pin on the first substrate; and a gap is provided between an edge, away from the display area, of the orthographic projection of the at least one second bonding pin on the first substrate, and an edge, away from the display area, of the orthographic projection of the at least one first bonding pin on the first substrate.

13. The array substrate of claim 12, wherein a groove, penetrating the first protective layer and the second protective layer, is provided in the bonding area and on one side of the at least one first bonding pin away from the display area.

14. The array substrate of claim 8, wherein a first plane is provided on one side of the insulating layer group away from the first substrate, and an orthographic projection of the first plane on the first substrate overlaps with an orthographic projection of the channel part on the first substrate.

15. The array substrate of claim 14, wherein a second plane is provided on the side of the insulating layer group away from the first substrate, and an orthographic projection of the second plane on the first substrate is within an orthographic projection of a spacing of two adjacent electrodes on the first substrate.

16. The array substrate of claim 2, wherein the gate layer comprises:
   a plurality of gate lines extending in a first direction, the first direction being parallel to the surface of the first substrate close to the switch layer group; and
   a plurality of second sub-electrodes arranged in an array, wherein at least one second sub-electrode of the plurality of second sub-electrodes is shaped as a frame, and the at least one first shading layer is provided within the frame.

17. The array substrate of claim 16, wherein the at least one first shading layer is integrated with the at least one second sub-electrode; or a second gap is provided between the at least one first shading layer and the at least one second sub-electrode.

18. A display panel, comprising:
   an array substrate;
   a color film substrate on one side of the array substrate close to the reflective layer;
   an adhesive frame between the array substrate and the color film substrate; and
   a liquid crystal layer between the array substrate and the color film substrate, and within the adhesive frame,
   wherein the array substrate comprises:
   a first substrate;
   a switch layer group on one side of the first substrate, wherein the switch layer group comprises a plurality of switch units and a plurality of first shading layers; the plurality of first shading layers are spaced apart; and at least one first shading layer of the plurality of first shading layers is disposed on a same layer and of a same material as one layer in at least one switch unit of the plurality of switch units;
   an insulating layer group on one side of the switch layer group away from the first substrate, wherein a plurality of first protrusions are provided on one surface of the insulating layer group away from the first substrate; a first connection part is connected between adjacent first protrusions, and a height, in a third direction, of a first protrusion of the adjacent first protrusions is higher than a height, in the third direction, of the first connection part; and an orthographic projection of the first protrusion and the first connection part on the first substrate is within an orthographic projection of the at least one first shading layer on the first substrate, the third direction being perpendicular to one surface of the first substrate close to the switch layer group; and
   a reflective layer on one side of the insulating layer group away from the first substrate, wherein a plurality of second protrusions are provided on one surface of the reflective layer away from the first substrate; an orthographic projection of at least one first protrusion of the plurality of first protrusions on the first substrate is within an orthographic projection of at least one second protrusion of the plurality of second protrusions on the first substrate; and the reflective layer comprises a plurality of reflective parts, and the orthographic projection of the at least one first shading layer on the first substrate is within an orthographic projection of at least one reflective part of the plurality of reflective parts on the first substrate.

19. The display panel of claim 18, wherein an overlapping area of an orthographic projection of the adhesive frame on the first substrate and an orthographic projection of an insulating layer in the insulating layer group on the first substrate is 0.

20. A display device, comprising a display panel, wherein the display panel comprises:
   an array substrate;
   a color film substrate on one side of the array substrate close to the reflective layer;
   an adhesive frame between the array substrate and the color film substrate; and
   a liquid crystal layer between the array substrate and the color film substrate, and within the adhesive frame,
   wherein the array substrate comprises:
   a first substrate;
   a switch layer group on one side of the first substrate, wherein the switch layer group comprises a plurality of switch units and a plurality of first shading layers; the plurality of first shading layers are spaced apart; and at least one first shading layer of the plurality of first shading layers is disposed on a same layer and of a same material as one layer in at least one switch unit of the plurality of switch units;
   an insulating layer group on one side of the switch layer group away from the first substrate, wherein a plurality of first protrusions are provided on one surface of the insulating layer group away from the first substrate; a first connection part is connected between adjacent first protrusions, and a height, in a third direction, of a first protrusion of the adjacent first protrusions is higher than a height, in the third direction, of the first connection part; and an orthographic projection of the first protrusion and the first connection part on the first substrate is within an orthographic projection of the at least one first shading layer on the first substrate, the third direction being perpendicular to one surface of the first substrate close to the switch layer group; and
   a reflective layer on one side of the insulating layer group away from the first substrate, wherein a plurality of second protrusions are provided on one surface of the reflective layer away from the first substrate; an orthographic projection of at least one first protrusion of the plurality of first protrusions on the first substrate is within an orthographic projection of at least one second protrusion of the plurality of second protrusions on the first substrate; and the reflective layer comprises a plurality of reflective parts, and the orthographic projection of the at least one first shading layer on the first substrate is within an orthographic projection of at least one reflective part of the plurality of reflective parts on the first substrate.

* * * * *